(12) United States Patent
Kaneko et al.

(10) Patent No.: US 9,479,284 B2
(45) Date of Patent: Oct. 25, 2016

(54) DISCOVERY METHOD, OPTICAL COMMUNICATION METHOD, AND OPTICAL COMMUNICATION SYSTEM

(71) Applicant: NIPPON TELEGRAPH AND TELEPHONE CORPORATION, Tokyo (JP)

(72) Inventors: Shin Kaneko, Yokosuka (JP); Shunji Kimura, Yokosuka (JP); Shinya Tamaki, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/648,878

(22) PCT Filed: Dec. 3, 2013

(86) PCT No.: PCT/JP2013/082460
§ 371 (c)(1),
(2) Date: Jun. 1, 2015

(87) PCT Pub. No.: WO2014/087994
PCT Pub. Date: Jun. 12, 2014

(65) Prior Publication Data
US 2015/0341137 A1 Nov. 26, 2015

(30) Foreign Application Priority Data
Dec. 5, 2012 (JP) .................. 2012-266406

(51) Int. Cl.
*H04B 10/272* (2013.01)
*H04J 14/08* (2006.01)
(Continued)

(52) U.S. Cl.
CPC ......... *H04J 14/0245* (2013.01); *H04B 10/272* (2013.01); *H04J 3/0682* (2013.01); *H04J 14/025* (2013.01); *H04J 14/0246* (2013.01); *H04J 14/08* (2013.01); *H04J 2014/0253* (2013.01)

(58) Field of Classification Search
CPC ............. H04B 10/272; H04J 14/0245; H04J 14/0246; H04J 14/025; H04J 14/08; H04J 2014/0253; H04J 3/0682
USPC ............................................... 398/67
See application file for complete search history.

(56) References Cited

U.S. PATENT DOCUMENTS

2006/0115271 A1* 6/2006 Hwang ............... H04J 14/0226
398/72
2009/0110400 A1* 4/2009 Nozue ................ H04J 14/0282
398/71

(Continued)

FOREIGN PATENT DOCUMENTS

JP 2011-223407 11/2011
JP 2011-228800 11/2011

OTHER PUBLICATIONS

International Preliminary Report on Patentability dated Jun. 18, 2015 corresponding to International Application No. PCT/JP2013/082460; 6 pages.

(Continued)

*Primary Examiner* — David Payne
*Assistant Examiner* — Omar S Ismail
(74) *Attorney, Agent, or Firm* — Ohlandt, Greeley, Ruggiero & Perle, L.L.P.

(57) ABSTRACT

A discovery method, an optical communication method, and an optical communication system which can reduce an error of RTTs when an identifier is fixed after an allocated wavelength has been changed in wavelength-tunable WDM/TDM-PON and can prevent lowering of the bandwidth utilization efficiency. A table, in which a correspondence between child nodes and fixed identifiers as well as the RTTs of a frame with each of the identifiers in all combinations of allocated wavelengths are recorded, is created through a discovery process.

7 Claims, 21 Drawing Sheets

(51) Int. Cl.
*H04J 14/02* (2006.01)
*H04J 3/06* (2006.01)

(56) References Cited

U.S. PATENT DOCUMENTS

2010/0158527 A1* 6/2010 Mizutani ............... H04B 1/707
 398/78
2013/0148956 A1* 6/2013 Khotimsky .......... H04B 10/032
 398/2

OTHER PUBLICATIONS

S. Kimura, "10-Gbit/s TDM-PON and over-40-Gbit/s WDM/TDM-PON systems with OPEX-effective burst-mode technologies", OFC2009, OWH6, 2009.

Technical Fundamentals Lecture, GE-PON Technology, NTT Technical Journal, pp. 91-94, Sep. 2005, with partial English Translation thereof.

International Search Report dated Mar. 11, 2014 corresponding to PCT/JP2013/082460; 2 pages.

* cited by examiner

Fig.16

| ONU | LLID | RTT |
|---|---|---|
| #1 | 1 | $T_1$ |
| #2 | 2 | $T_2$ |
| #3 | 3 | $T_3$ |
| ... | ... | ... |
| #K | K | $T_K$ |

Fig.17

| | LLID | RTT | | | | | | |
|---|---|---|---|---|---|---|---|---|
| | | $(\lambda_{D1}, \lambda_{U1})$ | $(\lambda_{D1}, \lambda_{UM})$ | ... | $(\lambda_{DM}, \lambda_{U1})$ | ... | $(\lambda_{DM}, \lambda_{UM})$ |
| #1 | 1 | $T_1(\lambda_{D1}, \lambda_{U1})$ | ... | $T_1(\lambda_{D1}, \lambda_{UM})$ | ... | $T_1(\lambda_{DM}, \lambda_{U1})$ | ... | $T_1(\lambda_{DM}, \lambda_{UM})$ |
| #2 | 2 | $T_2(\lambda_{D1}, \lambda_{U1})$ | ... | $T_2(\lambda_{D1}, \lambda_{UM})$ | ... | $T_2(\lambda_{DM}, \lambda_{U1})$ | ... | $T_2(\lambda_{DM}, \lambda_{UM})$ |
| #3 | 3 | $T_3(\lambda_{D1}, \lambda_{U1})$ | ... | $T_3(\lambda_{D1}, \lambda_{UM})$ | ... | $T_3(\lambda_{DM}, \lambda_{U1})$ | ... | $T_3(\lambda_{DM}, \lambda_{UM})$ |
| ... | ... | ... | ... | ... | ... | ... | ... | ... |
| #K | K | $T_K(\lambda_{D1}, \lambda_{U1})$ | ... | $T_K(\lambda_{D1}, \lambda_{UM})$ | ... | $T_K(\lambda_{DM}, \lambda_{U1})$ | ... | $T_K(\lambda_{DM}, \lambda_{UM})$ |

ONU

Fig.18

| | OPTICAL FIBER-SIDE PORTS | | | | | | |
|---|---|---|---|---|---|---|---|
| | #1 | #2 | #3 | ... | #H-1 | #H | |
| #1 | $\lambda_{D1}$ | $\lambda_{DM}$ | $\lambda_{D(M-1)}$ | ... | $\lambda_{U(M-H+3)}$ | $\lambda_{U(M-H+2)}$ | |
| #2 | $\lambda_{D2}$ | $\lambda_{D1}$ | $\lambda_{DM}$ | ... | $\lambda_{U(M-H+4)}$ | $\lambda_{U(M-H+3)}$ | |
| #3 | $\lambda_{D3}$ | $\lambda_{D2}$ | $\lambda_{D1}$ | ... | $\lambda_{U(M-H+5)}$ | $\lambda_{U(M-H+4)}$ | |
| ... | ... | ... | ... | ... | ... | ... | |
| #M-1 | $\lambda_{D(M-1)}$ | $\lambda_{D(M-2)}$ | $\lambda_{D(M-3)}$ | ... | $\lambda_{U(M-H+1)}$ | $\lambda_{U(M-H)}$ | |
| #M | $\lambda_{DM}$ | $\lambda_{D(M-1)}$ | $\lambda_{D(M-2)}$ | ... | $\lambda_{U(M-H+2)}$ | $\lambda_{U(M-H+1)}$ | |
| OPTICAL TRANSCEIVER-SIDE PORTS | | | | | | | |

Fig.19

| | | OPTICAL FIBER-SIDE PORTS | | | | | |
|---|---|---|---|---|---|---|---|
| | | #1 | #2 | #3 | ... | #H-1 | #H |
| OPTICAL TRANSCEIVER-SIDE PORTS | #1 | $\lambda_{U1}$ | $\lambda_{UM}$ | $\lambda_{U(M-1)}$ | ... | $\lambda_{D(M-H+3)}$ | $\lambda_{D(M-H+2)}$ |
| | #2 | $\lambda_{U2}$ | $\lambda_{U1}$ | $\lambda_{UM}$ | ... | $\lambda_{D(M-H+4)}$ | $\lambda_{D(M-H+3)}$ |
| | #3 | $\lambda_{U3}$ | $\lambda_{U2}$ | $\lambda_{U1}$ | ... | $\lambda_{D(M-H+5)}$ | $\lambda_{D(M-H+4)}$ |
| | ... | ... | ... | ... | ... | ... | ... |
| | #M-1 | $\lambda_{U(M-1)}$ | $\lambda_{U(M-2)}$ | $\lambda_{U(M-3)}$ | ... | $\lambda_{D(M-H+1)}$ | $\lambda_{D(M-H)}$ |
| | #M | $\lambda_{UM}$ | $\lambda_{U(M-1)}$ | $\lambda_{U(M-2)}$ | ... | $\lambda_{D(M-H+2)}$ | $\lambda_{D(M-H+1)}$ |

Fig.20

| | | OPTICAL FIBER-SIDE PORTS | | | | | |
|---|---|---|---|---|---|---|---|
| | | #1 | #2 | #3 | ... | #M-1 | #M |
| OPTICAL TRANSCEIVER-SIDE PORTS | #1 | $\lambda_{D1}$ | $\lambda_{D2}$ | $\lambda_{D3}$ | ... | $\lambda_{D(M-1)}$ | $\lambda_{DM}$ |
| | #2 | $\lambda_{DM}$ | $\lambda_{D1}$ | $\lambda_{D2}$ | ... | $\lambda_{D(M-2)}$ | $\lambda_{D(M-1)}$ |
| | #3 | $\lambda_{D(M-1)}$ | $\lambda_{DM}$ | $\lambda_{D1}$ | ... | $\lambda_{D(M-3)}$ | $\lambda_{D(M-2)}$ |
| | ... | ... | ... | ... | ... | ... | ... |
| | #H-1 | $\lambda_{D(M-H+3)}$ | $\lambda_{D(M-H+4)}$ | $\lambda_{D(M-H+5)}$ | ... | $\lambda_{D(M-H+1)}$ | $\lambda_{D(M-H+2)}$ |
| | #H | $\lambda_{D(M-H+2)}$ | $\lambda_{D(M-H+3)}$ | $\lambda_{D(M-H+4)}$ | ... | $\lambda_{D(M-H)}$ | $\lambda_{D(M-H+1)}$ |

Fig.21

| | OPTICAL FIBER-SIDE PORTS | | | | | | |
|---|---|---|---|---|---|---|---|
| | #1 | #2 | #3 | ... | #M-1 | #M | |
| #1 | $\lambda_{U1}$ | $\lambda_{U2}$ | $\lambda_{U3}$ | | $\lambda_{U(M-1)}$ | $\lambda_{UM}$ | |
| #2 | $\lambda_{UM}$ | $\lambda_{U1}$ | $\lambda_{U2}$ | | $\lambda_{U(M-2)}$ | $\lambda_{U(M-1)}$ | |
| #3 | $\lambda_{U(M-1)}$ | $\lambda_{UM}$ | $\lambda_{U1}$ | | $\lambda_{U(M-3)}$ | $\lambda_{U(M-2)}$ | |
| ... | ... | ... | ... | ... | ... | ... | |
| #H-1 | $\lambda_{U(M-H+3)}$ | $\lambda_{U(M-H+4)}$ | $\lambda_{U(M-H+5)}$ | | $\lambda_{U(M-H+1)}$ | $\lambda_{U(M-H+2)}$ | |
| #H | $\lambda_{U(M-H+2)}$ | $\lambda_{U(M-H+3)}$ | $\lambda_{U(M-H+4)}$ | | $\lambda_{U(M-H)}$ | $\lambda_{U(M-H+1)}$ | |
| OPTICAL TRANSCEIVER-SIDE PORTS | | | | | | | |

DISCOVERY METHOD, OPTICAL COMMUNICATION METHOD, AND OPTICAL COMMUNICATION SYSTEM

TECHNICAL FIELD

The present invention relates to a discovery method, an optical communication method, and an optical communication system in wavelength-tunable WDM/TDM-PON.

BACKGROUND ART

With increase of needs for a high-speed access service, FTTH (Fiber To The Home) has spread worldwide. Most of FTTH service is provided by an economically excellent PON (Passive Optical Network) system in which one storage station side device (OSU: Optical Subscriber Unit) stores a plurality of subscriber side devices (ONU: Optical Network Unit) by time division multiplexing (TDM). In TDM-PON, as shown in FIG. 1, a burst transmitter in each ONU 200 transmits signal light within a transmission permission time notified based on dynamic bandwidth allocation calculation in an OSU 51, and a burst receiver in the OSU 51 receives signal light obtained by multiplexer, on a time axis, signal lights having different intensities and phases, which have been sent from the ONUs 200. Although the current leading system is GE-PON (Gigabit Ethernet™ PON) and G-PON (Gigabit-capable PON) whose transmission rate is at the gigabit level, a video distribution service has been progressed, and, in addition, applications used to upload/download a bulk file has appeared, thereby the capacity of the PON system is required to be further increased. However, in the TDM-PON, since a system bandwidth is expanded by increasing a line rate, significant deterioration of reception characteristics due to influences of the speeding up and wavelength dispersion and economic efficiency of the burst transmitter and receiver become problematic, thereby it is difficult to increase the capacity to more than 10 gigabytes.

To increase the capacity to more than 10 gigabytes, application of a wavelength division multiplexing (WDM) technique has been considered. FIG. 2 shows an example of WDM/TDM-PON in which the WDM technique is combined with TDM-PON. A downstream wavelength and an upstream wavelength are allocated to each ONU 200a, and temporal overlap of signals between the ONUs 200a is permitted until reaching the number M (M is an integer not less than 2) of the OSUs 51 in a parent node 100a. Thus, an increase of the number of the OSUs 51 can expand the system bandwidth without increasing the line rate per one wavelength.

The ONUs 200a to which the same upstream wavelength has been allocated are connected logically to the same OSU 51 and share a bandwidth. When the wavelength allocated to each of the ONUs 200a is fixed, the logic connection between each of the ONUs 200a and the OSU 51 is unchanged, and the ONUs 200a connected to the different OSUs 51 cannot share a bandwidth, thereby bandwidth fairness is not secured.

Meanwhile, Non Patent Literature 1 proposes wavelength-tunable WDM/TDM-PON in which an ONU has a wavelength-tunable function, as shown in FIG. 3. In this method, an OSU logically connected in the unit of ONU is changed by changing the wavelength allocated to the ONU, and all the ONUs can share a system bandwidth. Thus, a wavelength-tunable burst transmitter in each of the ONUs transmits signal light within a notified transmission permission time, using a transmission wavelength notified based on dynamic allocation calculation in the OSU, thereby the bandwidth fairness can be secured among all the ONUs.

CITATION LIST

Non Patent Literature

[Non Patent Literature 1]
S. Kimura, "10-Gbit/s TDM-PON and over-40-Gbit/s WDM/TDM-PON systems with OPEX-effective burst-mode technologies", OFC2009, OWH6, 2009
[Non Patent Literature 2]
Technical Fundamentals Lecture, GE-PON Technology, NTT Technical Journal, pp. 91-94, September 2005.

SUMMARY OF INVENTION

Technical Problem

In TDM-PON, since signal light is broadcasted to all ONUs in downward communication, each of the ONUs judges whether a received frame is addressed to itself, using an identifier such as LLID (Logical Link ID) and selects the received frame. In an upward communication, the ONU sends a transmission frame in which the identifier given to itself is embedded, and an OSU judges from which ONU the frame has been sent from the identifier in the received frame. The OSU manages the identifiers of all the ONUs subordinate to the OSU itself and gives the identifier to a newly connected ONU through a discovery process to prevent overlap with the already connected ONUs. In the discovery process, a frame round trip time (RTT) between the OSU and the ONU is measured, and the OSU stores RTTs information between the OSU and all the ONUs subordinate to the OSU itself. The OSU determines a transmission permission time of upstream signal light from each of the ONUs while considering the RTTs, thereby collision of upstream signal light is avoided (see Non Patent Literature 2).

In wavelength-tunable WDM/TDM-PON, as in TDM-PON, each of the OSUs should grasps the identifiers of all the ONUs connected logically to the OSU itself and the RTTs information. In addition, the ONU should recognize the identifier given to itself. Here, in the wavelength-tunable WDM/TDM-PON, the OSU logically connected in the unit of ONU is changed by a change of a wavelength allocated to the ONU, and therefore, when the identifiers and the RTTs information are managed for each of the OSUs, a discover process should be performed again for each change of the allocated wavelength. However, since transmission of a data signal is not permitted during the discovery process, the bandwidth utilization efficiency is lowered.

The identifier given through the discovery process when a new ONU is registered is fixedly given after the change of the allocated wavelength, and a management table shown in FIG. 16 including measured RTTs and information of all the ONUs is shared between the OSUs, thereby it is not necessary to perform again the discovery process associated with the change of the allocated wavelength. However, a propagation speed during optical fiber transmission is different depending on a wavelength due to wavelength dependency of a refractive index in optical fibers, and therefore, when a wavelength that is different from a downstream/upstream wavelength used when the RTTs have been measured is allocated to the ONU, errors occur between the actual RTTs and the RTTs described in a management table. Since a transmission timing of upstream signal light is determined with the use of the RTTs, the upstream signal light may collide due to the error of the RTTs. Whereas, the collision of the signal light can be prevented by providing a guard interval with sufficient time between the upstream signal lights however, there is a problem that the bandwidth utilization efficiency is lowered.

Thus, in order to solve the above problem, an object of the present invention is to provide a discovery method, an optical communication method, and an optical communication system which can reduce an error of RTTs when an identifier is fixed after an allocated wavelength has been changed in wavelength-tunable WDM/TDM-PON and can prevent lowering of the bandwidth utilization efficiency.

Solution to Problem

In order to achieve the above object, the present invention creates, through a discovery process, a table in which a correspondence between child nodes and fixed identifiers as well as the RTTs of a frame with each of the identifiers in all combinations of allocated wavelengths are recorded.

More specifically, a discovery method according to the present invention is a discovery method in wavelength-tunable WDM/TDM-PON (WDM: Wavelength Division Multiplexing, TDM: Time Division Multiplexing, PON: Passive Optical Network) in which a parent node and child nodes are connected through optical fibers, and this discovery method is characterized in that an identifier that is unchanged even when a child node changes its downstream and upstream wavelength is given to the unregistered child node which sends a response signal in response to a search signal from the parent node, with a round trip time (RTTs) between the parent node and the child node and a wavelength dependency of the refractive index of the optical fibers, ranging is performed for calculating, for each of the identifiers, the RTTs in all combinations of downstream wavelengths of downstream signals from the parent node to the child node and upstream wavelengths of upstream signals from the child node to the parent node, and the RTTs in all the combinations calculated by the ranging are stored.

In this discovery method, the RTTs in all the combinations of the downstream wavelengths and the upstream wavelengths is calculated based on the wavelength of the search signal, the wavelength of the response signal, and the RTTs obtained in a discovery process and the wavelength dependency of the refractive index of a well-known optical fibers, and the RTTs are stored in a table. Thus, when the wavelength allocated to the child node is changed, an accurate transmission timing can be determined by referring the RTTs of the table. Therefore, a time of a guard interval between upstream signals lights can be reduced, and the bandwidth utilization efficiency can be improved.

Accordingly, the present invention can provide a discovery method which can reduce an error of the RTTs when an identifier is fixed after an allocated wavelength has been changed in a wavelength-tunable WDM/TDM-PON and can prevent lowering of the bandwidth utilization efficiency.

An optical communication method according to the present invention is an optical communication method in wavelength-tunable WDM/TDM-PON in which a parent node and child nodes are connected through optical fibers, and this optical communication method is characterized in that an identifier given to the child node is kept unchanged when a child node changes its downstream and upstream wavelengths, RTTs in all combinations of a downstream wavelength of a downstream signal from the parent node to the child node and an upstream wavelength of an upstream signal from the child node to the parent node are stored for each of the identifiers in a table, and with the use of the RTTs corresponding to the combination of the downstream wavelength and the upstream wavelength allocated to the child node which is detected by referring to the table, a transmission permission time of the upstream signal is determined, and the transmission permission time is notified to the child node.

This optical communication method uses the table in which the RTTs in all the combinations of the downstream wavelengths and the upstream wavelengths are stored. Namely, when a wavelength allocated to the child node is changed, an accurate transmission timing can be determined by referring to the RTTs of the table. Therefore, the time of the guard interval between the upstream signals lights can be reduced, and the bandwidth utilization efficiency can be improved.

Accordingly, the present invention can provide an optical communication method which can reduce an error of the RTTs when the identifier is fixed after the allocated wavelength has been changed in the wavelength-tunable WDM/TDM-PON and can prevent lowering of the bandwidth utilization efficiency.

The optical communication method according to the present invention is characterized in that the RTTs in all the combinations is calculated by the ranging performed during the discovery method.

Further, an optical communication system according to the present invention is an optical communication system including a parent node which sends downstream signals with wavelengths of $\lambda_{D1}$ to $\lambda_{DM}$ (M is an integer not less than 2) and receives upstream signals with wavelengths of $\lambda_{U1}$ to $\lambda_{UN}$ (N is an integer not less than 2), child nodes to which an identifier unchanged even when a child node changes its downstream and upstream wavelengths is given, to which one of the wavelengths $\lambda_{D1}$ to $\lambda_{DM}$ and one of the wavelengths $\lambda_{U1}$ to $\lambda_{UN}$ upstream are allocated from the parent node as a downstream wavelength and an upstream wavelength, respectively, and which receives a downstream signal on the allocated downstream wavelength and sends an upstream signal on the allocated upstream wavelength, and through which the parent node and the child nodes are connected to each other, and this optical communication system is characterized in that the parent node has a table for storing, for each of the identifiers, RTTs in all combinations of the downstream wavelengths and the upstream wavelengths and a controller which, determines a transmission permission time of an upstream signal with the use of the RTTs corresponding to the combination of the downstream wavelength and the upstream wavelength allocated to the child node which is detected by referring to the table, and notifies the child node of the transmission permission time of the upstream signal.

This optical communication system includes a table in which the RTTs in all the combinations of the downstream wavelengths and the upstream wavelengths are stored. Namely, when a wavelength allocated to the child node is changed, an accurate transmission timing can be determined by referring to the RTTs of the table. Therefore, the time of the guard interval between the upstream signal lights can be reduced, and the bandwidth utilization efficiency can be improved.

Accordingly, the present invention can provide an optical communication system which can reduce the error of the RTTs when the identifier is fixed after the allocated wavelength has been changed in the wavelength-tunable WDM/TDM-PON and can prevent lowering of the bandwidth utilization efficiency.

This optical communication system has the following configuration.

As the first configuration, the parent node has optical transceivers in which a unique downstream wavelength and a unique upstream wavelength are set and optical multiplexer/demultipler which is connected to the optical transceivers, outputs the downstream signals from the optical transceivers to the optical fibers, outputs the upstream signals from the optical fibers to the optical transceivers, and the controller controls one of the optical transceivers to send a search signal on a fixed downstream wavelength and, executes the discovery method, using a response signal received at the optical transceivers.

As the second configuration, the parent node has optical transceivers in which downstream wavelengths of $\lambda_{D1}$ to $\lambda_{DM}$ can be set and wavelength router which is connected to the optical transceivers through optical transceiver-side-side ports, which outputs the downstream signals from the optical transceiver-side ports to different optical fiber-side ports according to downstream wavelengths, is connected to the optical fibers through optical fiber-side ports, outputs the upstream signals from the optical fiber-side ports, to the different optical transceiver-side ports according to upstream wavelengths, and the controller controls some of the optical transceivers to send a search signal on one downstream wavelength and, executes the above-described discovery method, using a response signal received at the optical transceivers.

As the third configuration, the parent node has optical transceivers in which at least one of downlink wavelengths can be set of among the wavelengths of $\lambda_{D1}$ to $\lambda_{DM}$ and optical multiplexer/demultiplexer which is connected to the optical transceivers, outputs the downstream signals from the optical transceivers to the optical fibers, outputs the upstream signals from the optical fibers to the optical transceivers, and the controller controls at least one of the optical transceivers to send search signals on several downstream wavelengths and executes the above-described discovery method, using a response signal received at the optical transceivers.

As the fourth configuration, the parent node has optical transceivers in which downstream wavelengths of $\lambda_{D1}$ to $\lambda_{DM}$ can be set and wavelength router which is connected to the optical transceivers through optical transceiver-side ports, outputs the downstream signals from the optical transceiver-side-ports to different optical fiber-side ports according to a downstream wavelengths, outputs the upstream signals from the optical fiber-side ports, to to the different optical transceiver-side ports according to upstream wavelengths, and the controller controls one of the optical transceivers to send search signals on several downstream wavelengths and, executes the above-described discovery method, using a response signal received at the optical transceivers.

Advantageous Effects of Invention

The present invention can provide a discovery method, an optical communication method, and an optical communication system which can reduce an error of RTTs when an identifier is fixed after an allocated wavelength has been changed in wavelength-tunable WDM/TDM-PON and can prevent lowering of the bandwidth utilization efficiency.

BRIEF DESCRIPTION OF DRAWINGS

Figure 16:
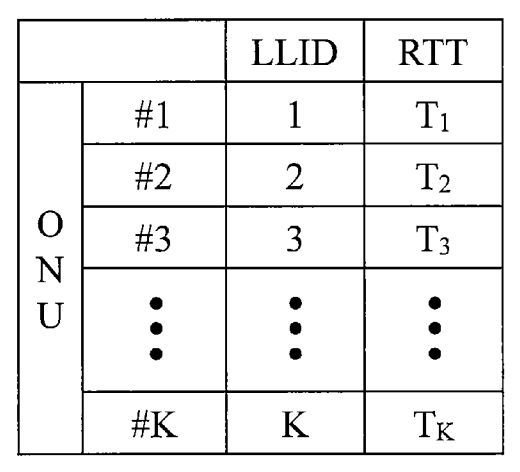

FIG. 16 is a view for explaining a management table in which information of all ONUs is described;

FIG. 17 is a view for explaining a management table of an optical communication system according to the present invention;

FIG. 18 is an example of an input/output relationship of downstream signal light (M≥H) in wavelength router;

FIG. 19 is an example of an input/output relationship of uplink signal light (M≥H) in the wavelength router;

FIG. 20 is an example of an input/output relationship of downstream signal light (M>H) in the wavelength router; and FIG. 21 is an example of an input/output relationship of upstream signal light (M>H) in the wavelength router.

DESCRIPTION OF EMBODIMENTS

Figure 1:
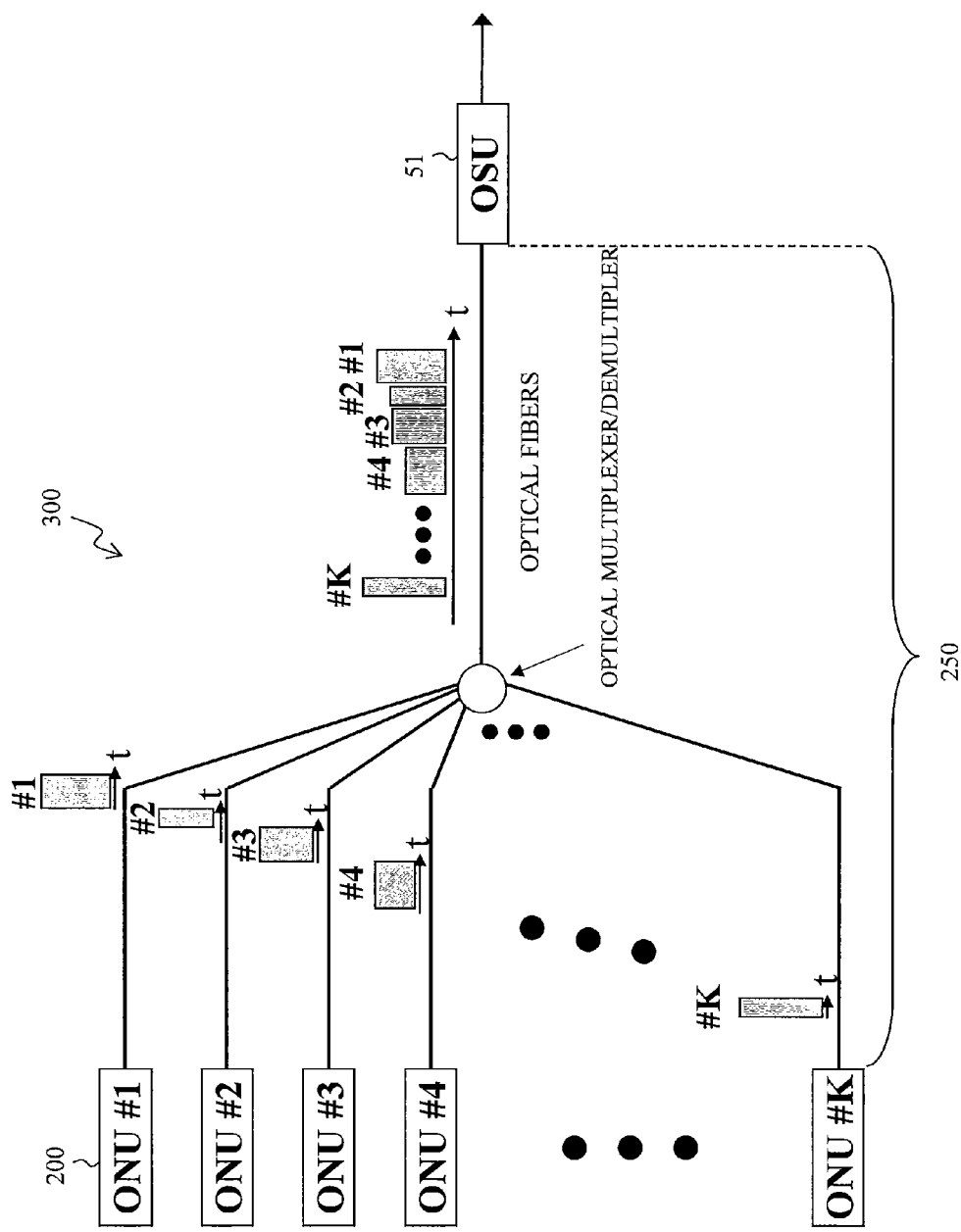
FIG. 1 is a view for explaining a configuration of TDM-PON.
Figure 2:
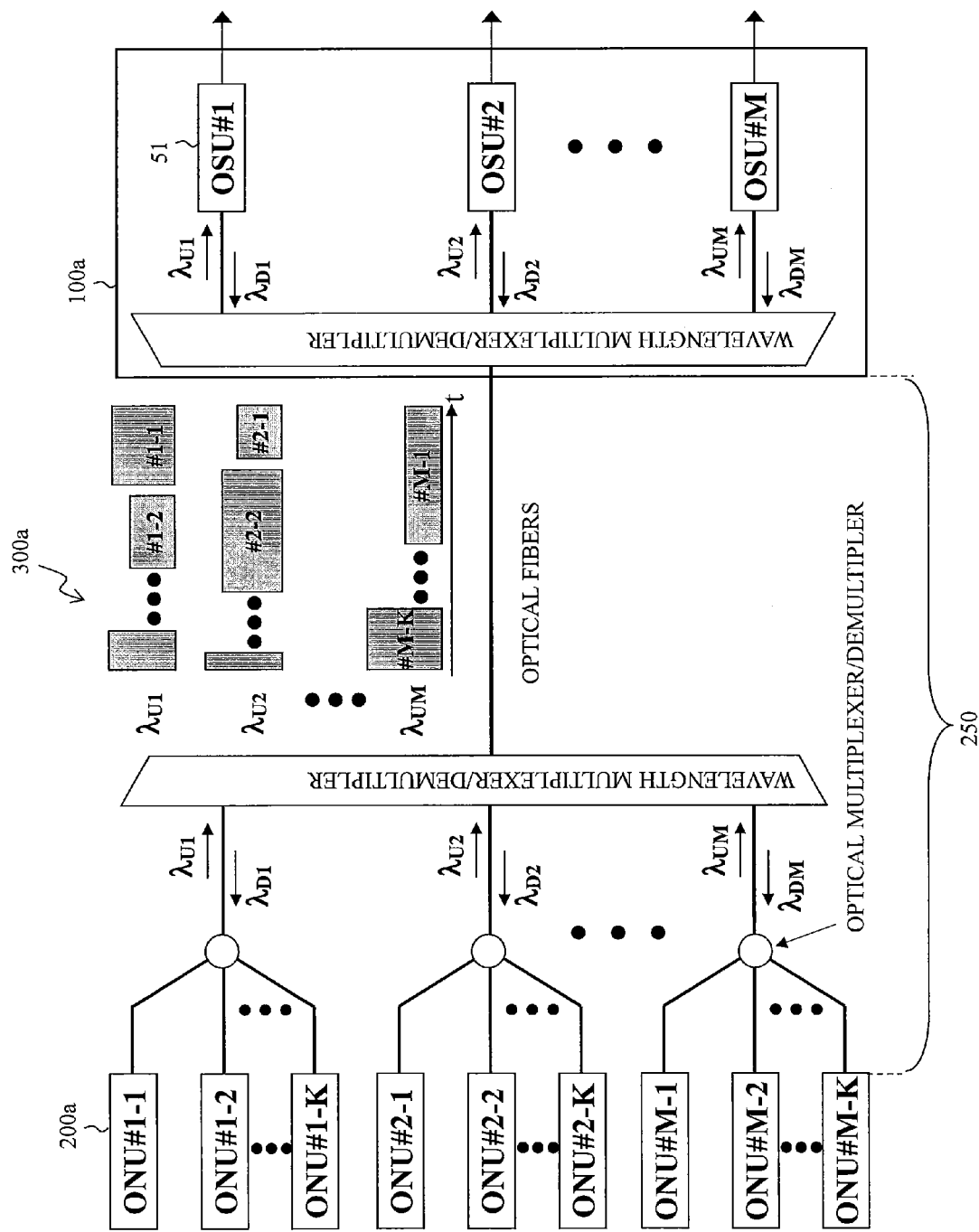
FIG. 2 is a view for explaining a configuration of WDM/TDM-PON.

Embodiments of the present invention will be described with reference to the accompanying drawings. The embodiments to be described hereinafter are examples of the present invention, and the present invention is not limited to the following embodiments. Components denoted by the same reference numerals in the present specification and the drawings mutually denote the same components.

[First Embodiment]

An optical communication system 301 of a first embodiment is provided with a parent node 100a which sends downstream signals with wavelengths of $\lambda_{D1}$ to $\lambda_{DM}$ (M is an integer not less than 2) and receives upstream signals with wavelengths of $\lambda_{U1}$ to $\lambda_{UN}$ (N is an integer not less than 2), child nodes 200a to which an identifier unchanged even when a child node changes its downstream and upstream wavelengths is given, to which one of the wavelengths $\lambda_{D1}$ to $\lambda_{DM}$ and one of the wavelengths $\lambda_{U1}$ to $\lambda_{UN}$ are allocated from the parent node as a downstream wavelength and an upstream wavelength, respectively, and which receives a downstream signal on the allocated downstream wavelength and sends an upstream signal on the allocated upstream wavelength, and optical fibers 250 through which the parent node 100a and the child nodes 200a are connected to each other, and in this optical communication system, the parent node 100a has a table (not shown) for storing, for each of the identifiers, RTTs in all combinations of the downstream wavelengths and the upstream wavelengths and a controller (not shown) which determines a transmission permission time of an upstream signal with the use of the RTT corresponding to the combination of the downstream wavelength and the upstream wavelength allocated to the child node which is detected by referring to the table, and notifies the child node of the transmission permission time of the upstream signal.

Further, the parent node 100a has optical transceivers 51 in which a unique downstream wavelength and a unique upstream wavelength are set and optical multiplexer/demultipler 151 which is connected to the optical transceivers 51, outputs the downstream signals from the optical transceivers to optical fibers 250, outputs the upstream signals from the optical fibers 250 to the optical transceiver 51, and the controller controls one of the optical transceivers 51 to send a search signal on a fixed downstream wavelength and, executes discovery using a response signal received at the optical transceivers 51.

Figure 3:
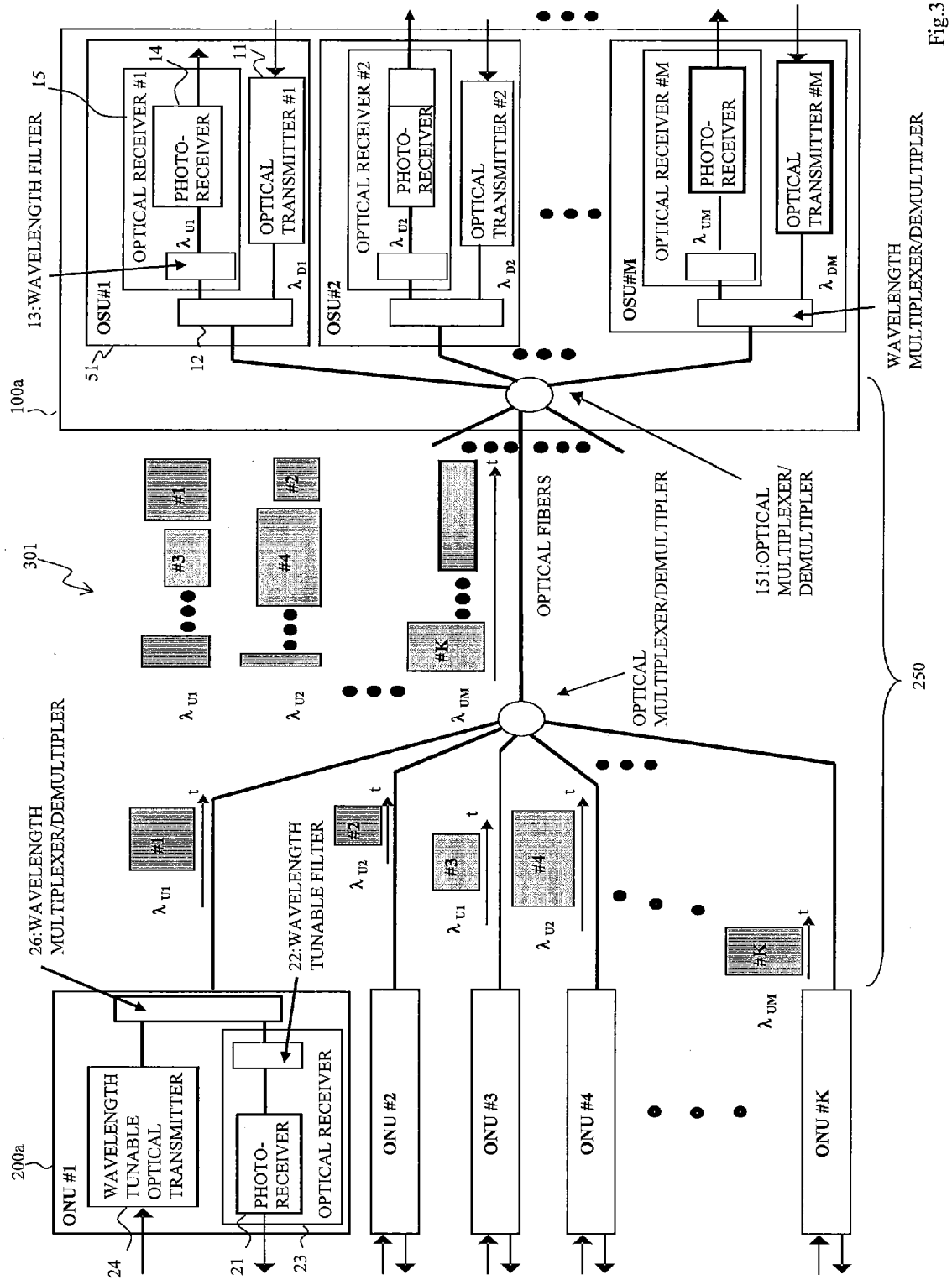
FIG. 3 is a view for explaining a configuration of wavelength-tunable WDM/TDM-PON.

The optical communication system 301 has the same configuration as wavelength-tunable WDM/TDM-PON of FIG. 3. The parent node 100a which sends downstream signal lights with wavelengths of $\lambda_{D1}$ to $\lambda_{DM}$ (M is an integer not less than 2) and receives i upstream signal lights with wavelengths of $\lambda_{U1}$ to $\lambda_{UM}$ is connected to child nodes (ONU) 200a, to which one of the wavelengths $\lambda_{D1}$ to $\lambda_{DM}$ and one of the wavelengths $\lambda_{U1}$ to $\lambda_{UM}$ are allocated from the parent node 100a as a downstream wavelength and upstream wavelength, respectively, through the optical fibers 250. When the child node 200a is newly registered in the parent node 100a, and for example, when the child node 200a is first connected to network, an identifier such as LLID is given, as a unique identifier for each of the child nodes 200a, to the child node 200a through a discovery process to prevent overlap with the already registered child nodes 200a. Here, the once-given identifier is fixedly given regardless of a change of a wavelength allocated to the child node 200a. The parent node 100a creates, through the discovery process, a management table (not shown in FIG. 3) as shown in FIG. 17 in which a correspondence between the child nodes 200a and the identifiers as well as the RTTs of a frame with each of the child nodes 200a in all the combinations of the allocated wavelengths are recorded. In FIG. 17, the LLID is used as the identifier.

The parent node 100a has a plurality of OSUs 51. The OSU 51 has an optical transmitter 11, wavelength multiplexer/demultiper 12, and an optical receiver 15. The optical receiver 15 includes a wavelength filter 13 and a photoreceiver 14.

Figure 4:
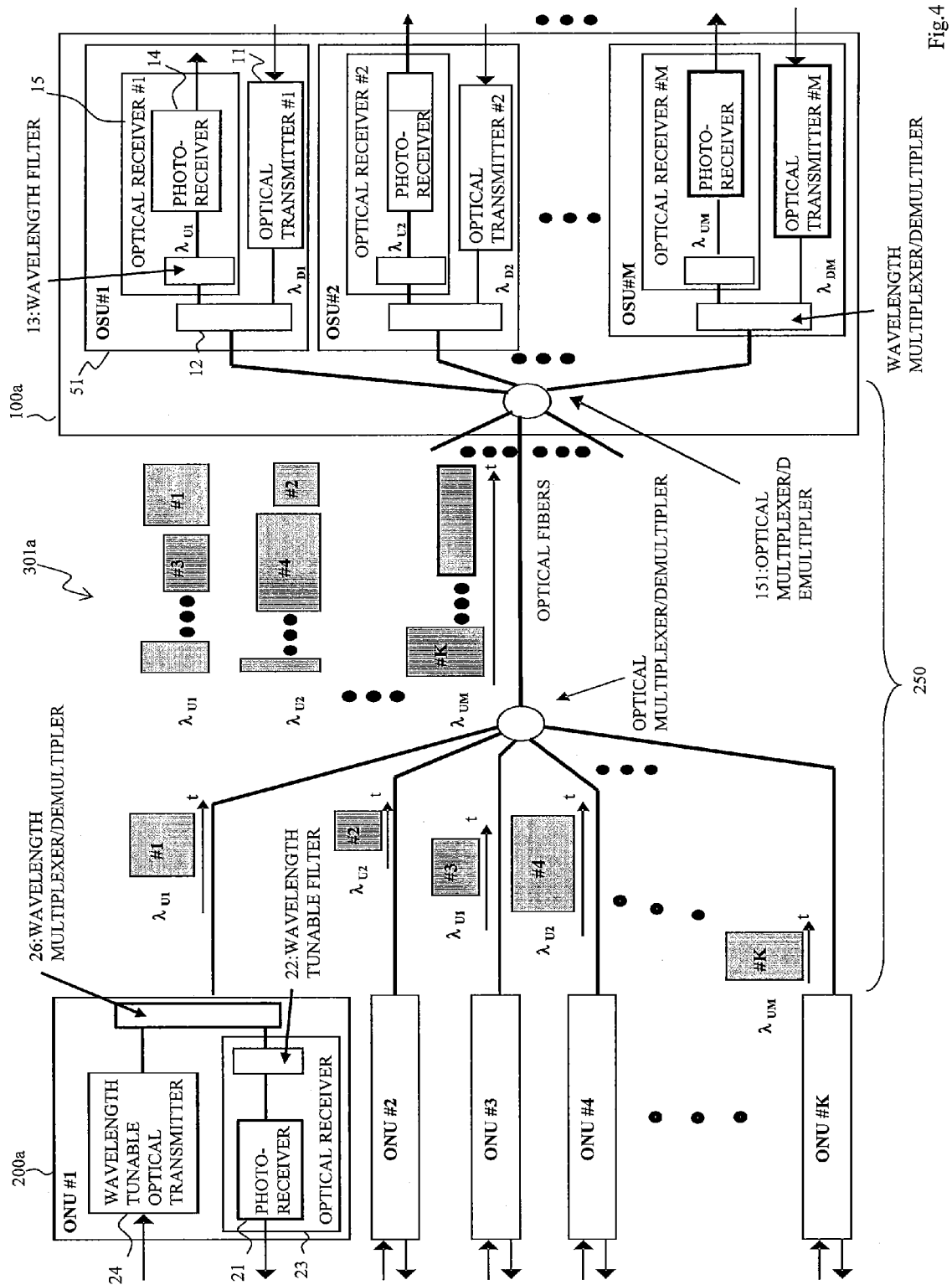
FIG. 4 is a view for explaining a configuration of wavelength-tunable WDM/TDM-PON.
Figure 5:
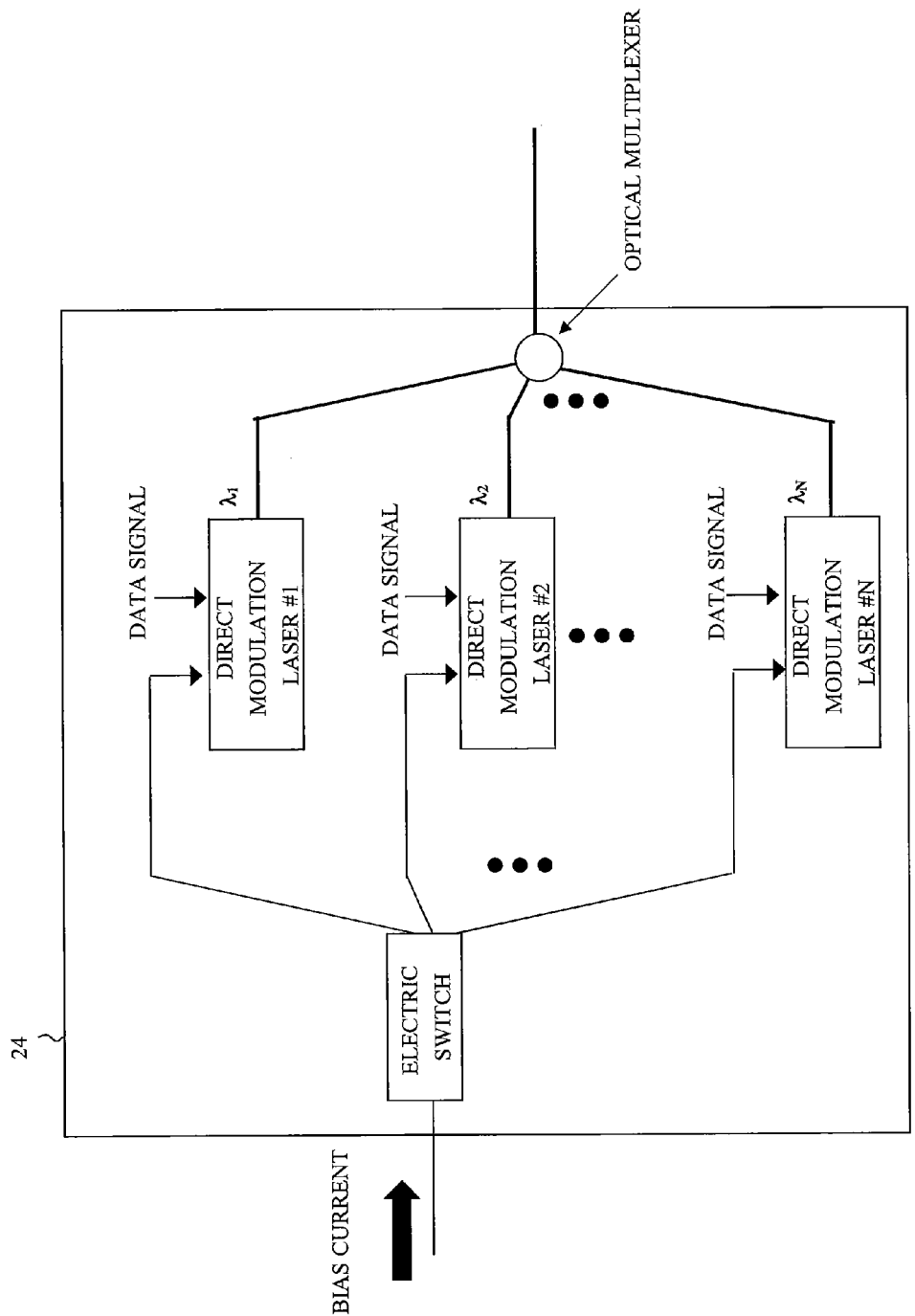
FIG. 5 is a view for explaining a configuration of a wavelength-tunable transmitter.

The parent node 100a is provided with optical transmitters 11 #1 to #M used for downward communication and sending downstream signal lights with different wavelengths. The downstream signal light from each of the optical transmitters 11 is wavelength-multiplexed by the optical multiplexer/demultiper 151 and then output to the optical fibers 250. As the optical multiplexer/demultipler 151, an optical fiber and an optical coupler created by a PLC (Planar Lightwave Circuit) are used. Although FIG. 3 shows a configuration in which the optical multiplexer/demultipler 151 has ports on the optical fibers 250 side, the optical multiplexer/demultipler 151 may have only one port as shown in FIG. 4.

The child node 200a selectively receives the downstream signal light as the downstream wavelength allocated from the parent node 100a from among the wavelength multiplexer signal light input to the child node 200a. The child node 200a has an optical receiver 23. In the optical receiver 23, a wavelength-tunable filter 22 is disposed on the preceding stage of an photoreceiver 21 such as PIN-PD (Photo-Diode) and APD (Avalanche Photo-Diode), as shown in FIGS. 3 and 4, and a transparent wavelength of the wavelength-tunable filter 22 is changed according to an allocated downstream wavelength, thereby the optical receiver 23 can selectively receive downstream signal light having a desired wavelength. Each of the child nodes 200a judges whether a received frame is addressed to itself, using an identifier and selects the received frame.

Meanwhile, the child node 200a is provided with a wavelength-tunable optical transmitter 24 for upward direction communication which can send the upstream single lights with wavelengths of $\lambda_{U1}$ to $\lambda_{UM}$ and sends the upstream signal light within a transmission permission time notified from the parent node 100a, using the upstream wavelength allocated from the parent node 100a. The transmission permission time notified from the parent node 100a is determined with the use of the Rtts described in the management table to prevent collision between the signal lights from the different child nodes 200a to which the same upstream wavelength is allocated. As the wavelength-tunable optical transmitter 24, there are used a configuration in which an output light wavelength of a direct modulation laser such as a distributed feedback (DFB) laser is changed by temperature control and a configuration in which direct modulation lasers having different output light wavelengths are arranged in an array, and high-speed wavelength switching in which a laser emitting light is switched by an external control signal can be performed. Output light from the wavelength-tunable light source may be externally modulated using, for example, a Mach-Zehnder modulator formed from a semiconductor and lithium niobate ($LiNbO_3$), an electroabsorption (EA) modulator, or a semiconductor optical amplifier (SOA). As the wavelength-tunable light source, there is used a configuration in which continuous wave (CW) laser having different output light wavelengths are arranged in an array, and the output light wavelength is switched with an external control signal. Alternatively, a DBR laser and an external resonator type laser may be used as the wavelength-tunable light source.

The upstream signal light sent to the parent node 100a is output by the optical multiplexer/demultipler 151 and then input to optical receivers 15 #1 to #M selectively receiving upstream signal lights with different wavelengths. As shown FIGS. 3 and 4, wavelength filters 13 with different transparent wavelengths each other are arranged on the preceding stage of the photoreceiver 14 such as PIN-PD and APD, thereby the upstream signal lights with different wavelengths can be selectively received by each of the optical receivers 15. Here, when each of the child nodes 200a sends upstream signal light in which the identifier given to the child node 200a itself is embedded in a transmission frame, the parent node 100a can judge from which child node 200a a received frame has been transmitted from the identifier in the received frame.

Figure 6:
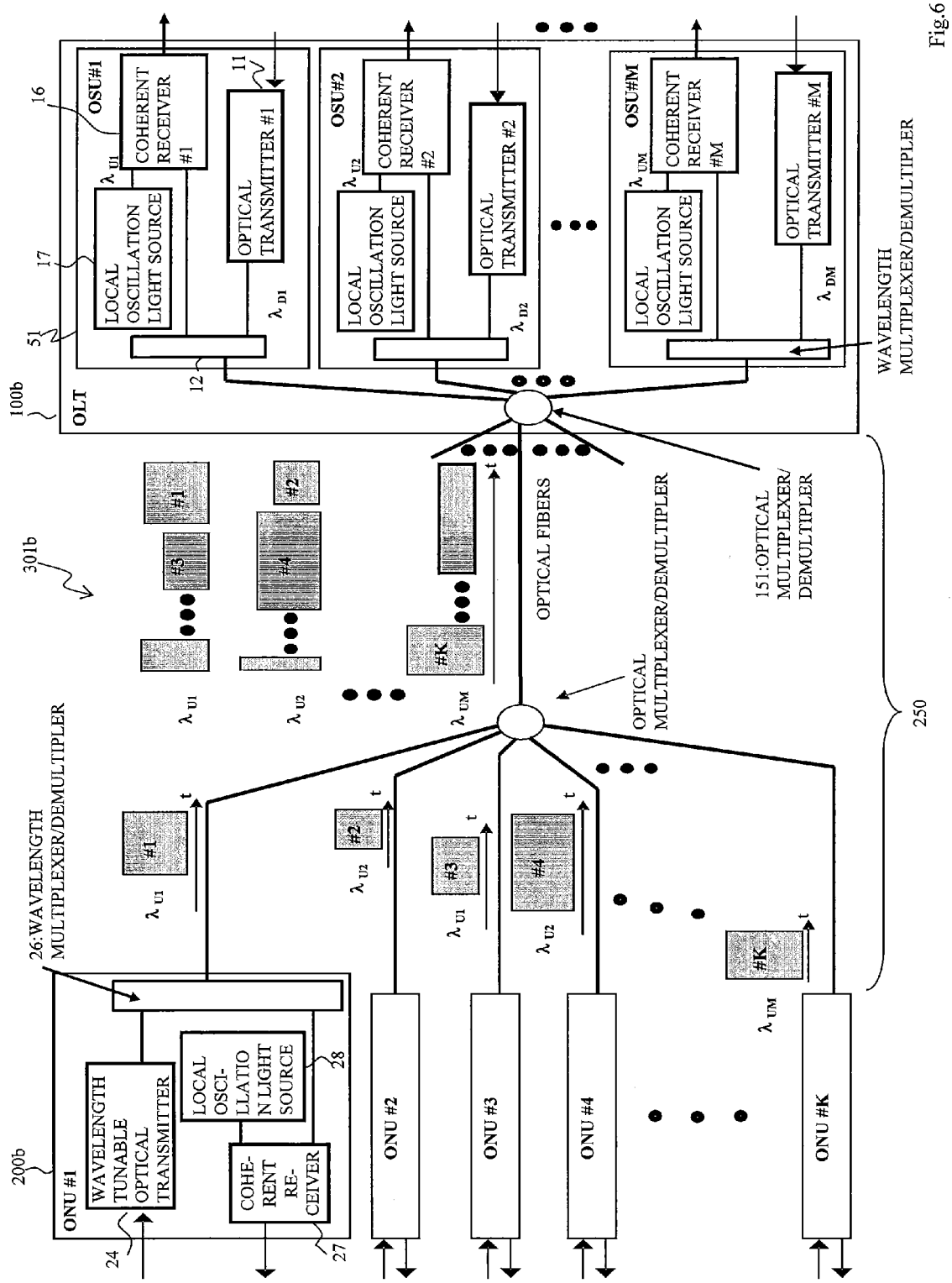
FIG. 6 is a view for explaining a configuration of wavelength-tunable WDM/TDM-PON.

In FIGS. 3 and 4, the wavelength filter 13 and the wavelength-tunable filter 22 are each disposed on the preceding stage of the photoreceiver (14, 21) in the child node 200a and the parent node 100a, and only the wavelength of desired signal light is transmitted through the filter; however, as shown in FIG. 6, a coherent receiver (16, 27) may be used as an optical receiver in the child node 200b and the parent node 100b. In this case, an output light wavelength of a local oscillation light source 28 in the child node 200b is set close to the wavelength of allocated downstream signal light. Meanwhile, the output light wavelength of a local oscillation light source 17 in the parent node 100b is set close to any one of wavelengths $\lambda_{U1}$ to $\lambda_{UM}$ so that the output light wavelengths differ in the respective coherent receivers 16. The application of coherent reception characterized by high receiving sensitivity can increase allowable loss in the optical fibers 250 and the parent node 100b. The increase in transmission loss and branching loss allowed in the optical fibers 250 can extend a transmission distance and increase the number of the stored child nodes 200b. Since the number of optical transceivers (the number of the OSUs 51) can be increased by the increase in the branching loss allowed in the parent node 100b, a system total bandwidth can be expanded. Since the wavelength filters (13, 22) are eliminated by the application of the coherent reception, an adjacent wavelength interval can be narrowed without being limited by the characteristics of the wavelength filter.

Figure 7:
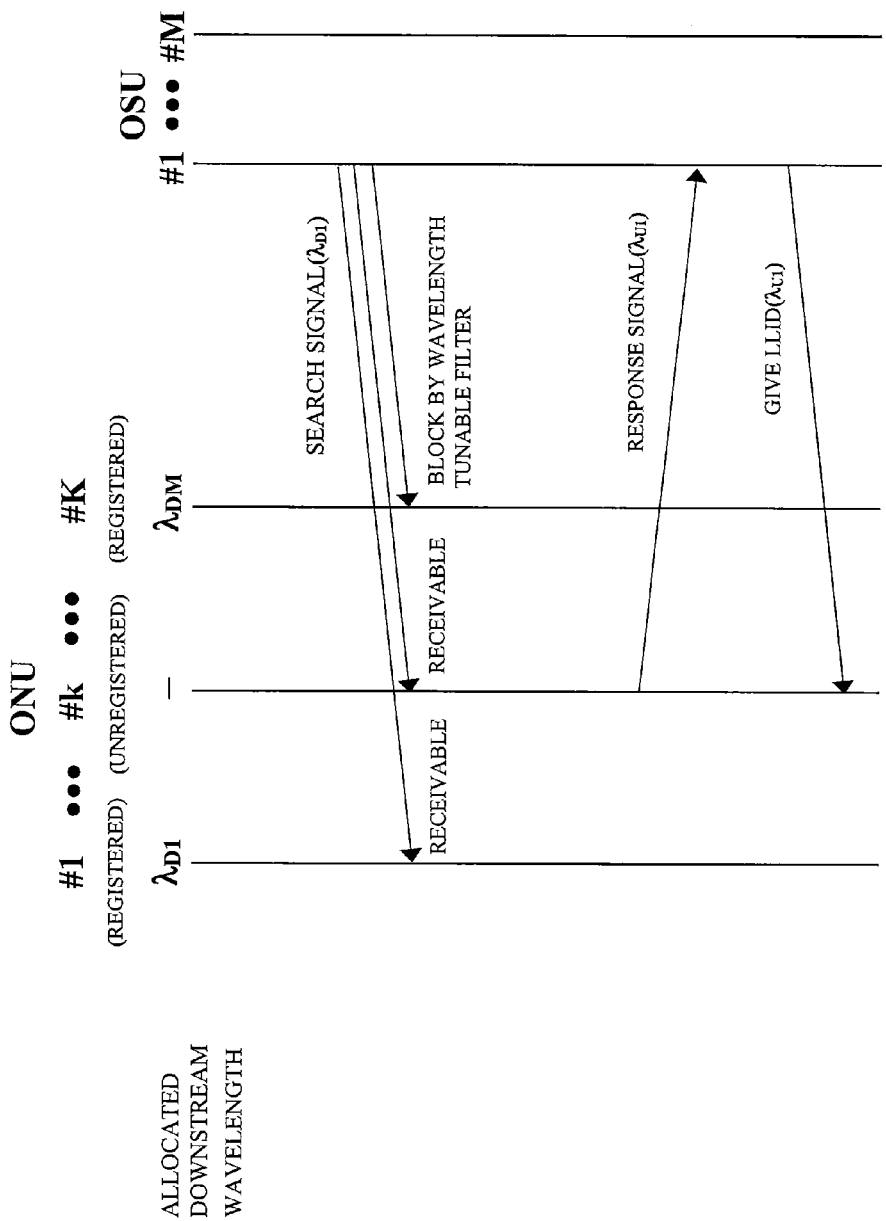
FIG. 7 is a view for explaining a discovery method according to the present invention.

FIG. 7 shows a procedure in which the identifier is given through the discovery process. The discovery method is a discovery method in wavelength-tunable WDM/TDM-PON in which the parent node 100a and the child node 200a are connected through the optical fibers 250, while the identifier unchanged even when child node changes its downstream and upstream wavelengths is given to the unregistered child node 200a which has responded to the search signal, sent from the parent node 100a, with a response signal, ranging is performed for calculating, for each of the identifiers, the RTTs in all combinations of downstream wavelengths of downstream signals from the parent node 100a to the child node 200a and upstream wavelengths of upstream signals from the child node 200a to the parent node 100a, using the RTT between the parent node 100a and the child node 200a and a wavelength dependency of the refractive index of the optical fibers 250, and the RTTs in all the combinations calculated by the ranging are stored.

One of the optical transmitters 11 in the parent node (100a, 100b) sends a search signal with a wavelength $\lambda_{Dm}$ (m=1, 2, . . . , and M) at a predetermined time. When the received child node (200a, 200b) is not registered in the parent node (100a, 100b) and does not have an identifier, an instruction indicating that the response signal as a registration request is sent at a predetermined time is described in the search signal. Here, when the child node (200a, 200b) is not registered, a wavelength control circuit in the child node (200a, 200b) is previously set so that the transparent wavelength of the wavelength-tunable filter 22 in the child node (200a, 200b) or the output light wavelength of the local oscillation light source 28 is $\lambda_{Dm}$ thereby the unregistered child node (200a, 200b) can reliably receive the search signal. Further, when the child node is not registered, a method of periodically sweeping the transparent wavelength of the wavelength-tunable filter 22 in the child node or the output light wavelength of the local oscillation light source in a range of from $\lambda_{D,1}$ to $\lambda_{D,M}$ is used, thereby the unregistered child node can reliably receive the search signal. In the designation of the wavelength of the response signal, the search signal may include an instruction indicating that the wavelength of the response signal is $\lambda_{Un}$ (n=1, 2, . . . , and M), or the wavelength control circuit in the child node (200a, 200b) may be previously set so that the output light wavelength of the wavelength-tunable optical transmitter 24 is set to $\lambda_{Un}$ when the search signal of $\lambda_{Dm}$ is received. The response signal transmitted to the parent node (100a, 100b) is branched by the optical multiplexer/demultipler 151 and then received by the optical receiver #n. In FIG. 7, although m=n=1, it may be that m≠n. In FIG. 7, the LLID is used as the identifier.

When the parent node (100a, 100b) receives the response signal as the registration request from the unregistered child node (200a, 200b) #k (k=1, 2, . . . , and K, K is an integer not less than 1), the parent node gives the identifier to the child node (200a, 200b) #k of a transmission source so as to prevent overlap with the already registered child nodes (200a, 200b). At the same time, the RTTs are calculated in all combinations of the downstream wavelengths and the upstream wavelengths allocated to the child node (200a, 200b) #k after the registration from a time $T_k$ ($\lambda_{Dm}$, $\lambda_{Un}$) required for transmission and reception of the search signal and the response signal. The method of calculating the RTTs will be described below. When a distance between the child node (200a, 200b) #k and the parent node (100a, 100b) is $L_k$ [km], the speed of light in vacuum is c [km/s], and the refractive indexes of the wavelengths $\lambda_{Dm}$ and $\lambda_{Un}$ in the optical fibers 250 are $n_{Dm}$ and $n_{Un}$, it can be represented as the formula (1):

$$T_k(\lambda_{Dm}, \lambda_{Un}) = \frac{n_{Dm}}{c} \cdot L_k + \frac{n_{Un}}{c} \cdot L_k \quad (1)$$

Thus, the round trip time $T_k$ ($\lambda_{Dm'}$ and $\lambda_{Un'}$) obtained when the wavelengths of which refractive indexes in the optical fibers 250 are $n_{Dm'}$ and $n_{Un'}$ are allocated as the downstream wavelength and the upstream wavelength to the child node (200a, 200b) #k can be calculated by the formula (2):

$$T_k(\lambda_{Dm'}, \lambda_{Un'}) = \frac{n_{Dm'}}{c} \cdot L_k + \frac{n_{Un'}}{c} \cdot L_k = \frac{n_{Dm'} + n_{Un'}}{n_{Dm} + n_{Un}} \cdot T_k(\lambda_{Dm}, \lambda_{Un}) \quad (2)$$

When the round trip time is calculated for all the combinations of the downstream wavelengths and the upstream wavelengths allocated to the child node (200a, 200b) after the registration, the management table of FIG. 17 can be created.

An optical communication method in the optical communication system 301 is an optical communication method in the wavelength-tunable WDM/TDM-PON in which the parent node 100a and the plurality of child nodes 200a are connected through the optical fibers 250, and the identifier given to the child node 200a is kept unchanged even when the child node changes its downstream and upstream wavelengths, the RTTs in all combinations of the downstream wavelengths of the downstream signals from the parent node 100a to the child node 200a and the upstream wavelengths of the upstream signals from the child node 200a to the parent node 100a are stored for each of the identifiers in the table, with the use of the RTTs corresponding to the combination of the downstream wavelength and the upstream wavelength allocated to the child node 200a is detected with reference to the table, and the transmission permission time of the upstream signal and notified to the child node 200a.

The RTTs in all the combinations is calculated by the ranging performed during the discovery method.

In this embodiment, when the child node (200a, 200b) is newly registered, the identifier given through the discovery process is fixedly given after the change of the allocated wavelength, and the management table shown in FIG. 17 in which the RTTs and the information on all the child nodes (200a, 200b) are described is provided in the parent node (100a, 100b); therefore, it is not necessary to perform again the discovery process associated with the change of the allocated wavelength. Further, since FIG. 17 describes the RTTs in all the combinations of the downstream wavelengths and the upstream wavelengths allocated to the child nodes (200a, 200b), when the transmission timing of the upstream signal light of each of the child nodes (200a, 200b) is determined, the parent node (100a, 100b) can use high-precision RTTs information without depending on the allocated wavelength. Therefore, the bandwidth utilization efficiency can be enhanced by reducing a guard interval between the upstream signal lights from the different child nodes (200a, 200b).

[Second Embodiment]

Figure 8:
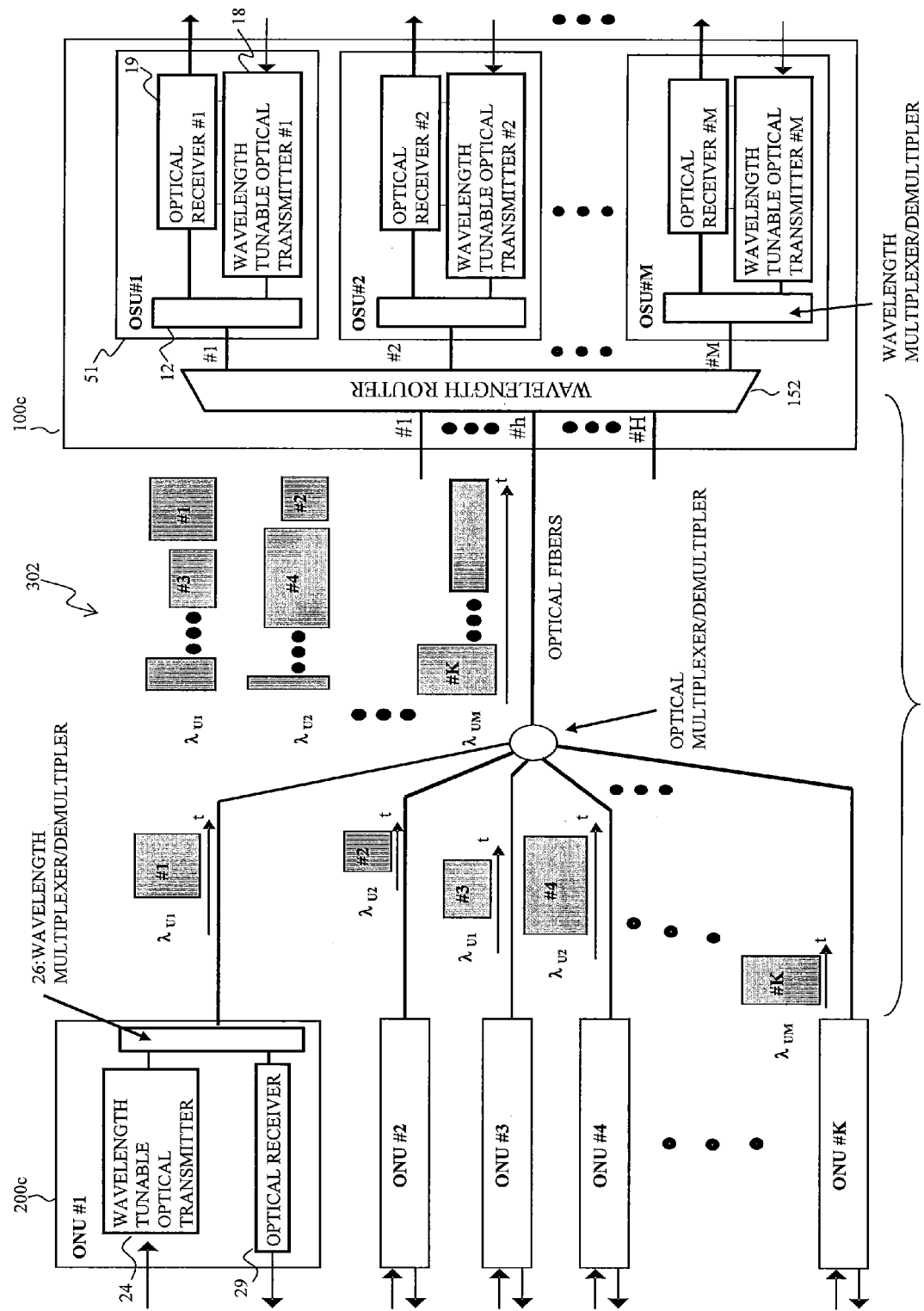
FIG. 8 is a view for explaining a configuration of wavelength-tunable WDM/TDM-PON.

FIG. 8 shows a configuration of wavelength-tunable WDM/TDM-PON which is an optical communication system 302 in a second embodiment. The optical communication system 302 is provided with a parent node 100c, a child node 200c, and optical fibers 250.

The parent node 100c of the optical communication system 302 has optical transceivers 51 in which downstream wavelengths of $\lambda_{D1}$ to $\lambda_{DM}$ can be set and wavelength router 152 which is connected to the optical transceivers 51 through optical transceiver-side ports, which outputs the downstream signals from the optical transceiver-side ports to different optical fiber-side ports according to downstream wavelengths, is connected to the optical fibers 250 through optical fiber-side ports, outputs the upstream signals from the optical fiber-side ports to the different optical transceiver-side ports according to upstream wavelengths, and the controller controls some of the optical transceivers 51 to send a search signal on one downstream wavelength and, executes the above-described discovery method, using a response signal received at the optical transceivers 51.

In the parent node 100c, instead of the optical multiplexer/demultipler 151 in the parent node in the first embodiment, wavelength router 152 which sorts input light according to the wavelength and outputs the input light from different ports is used. As in the first embodiment, an identifier such as LLID given through the discovery process is fixedly given to each of the child nodes 200c regardless of a change of an allocated wavelength, and the parent node 100c is provided with the management table as shown in FIG. 17 in which the correspondence between the child nodes 200c and the identifiers as well as the RTTs of a frame with each of the child nodes 200c in all the combinations of the allocated wavelengths are recorded. In FIG. 17, the LLID is used as the identifier.

The parent node 100c is provided with wavelength-tunable optical transmitter 18 #1 to #M which are used for downward communication and can send downstream signal lights having wavelengths $\lambda_{D1}$ to $\lambda_{DM}$. The downstream signal light from each of the wavelength-tunable optical transmitter 18 is input to the wavelength router 152 through separate optical transceiver-side ports and output from the different optical transceiver-side ports according to the wavelength to the optical fibers 250. The wavelength-tunable optical transmitter 18 changes a transmission wavelength of downstream signal light according to the fact that the child node 200c as the destination of the frame is connected to which of the optical fiber-side ports through the optical fibers 250. The wavelength variable optical transmitter 18 changes a transmission wavelength of downstream signal light according to the fact that the child node 200c as the destination of the frame is connected to which of the optical fiber-side ports through the optical fibers 250. In the wavelength router 152, the number H (H is an integer not less than 1) of the optical fiber-side ports is not more than the number M of the optical transceiver-side ports, and there is used, for example, AWG (Arrayed Waveguide Grating) for sorting light with a wavelength of $\lambda_{D1}$ to $\lambda_{DM}$, input from each of the optical transceiver-side ports, into the optical fiber-side ports #1 to #H according to the wavelength as shown in FIG. 18.

The child node 200c is connected to one of the optical fiber-side ports of the wavelength router 152 in the parent node 100c through the optical fibers 250 and receives the downstream signal light output from the connected ports. Each of the child nodes 200c judges, using an identifier, whether the received frame is addressed to itself and selects the received frame.

Meanwhile, the child node 200c is provided with the wavelength-tunable optical transmitter 24 for upward direction communication, which can transmit the upstream signal light with a wavelength of $\lambda_{U1}$ to $\lambda_{UM}$ and send the upstream signal light within a transmission permission time notified from the parent node 100c with an upstream wavelength allocated from the parent node 100c. With the use of the Rtts, the transmission permission time notified from the parent node 100c is determined described in a management table (not shown in FIG. 8) so as to prevent collision between the upstream signal lights addressed to the same optical receiver 19 in the parent node 100c. The wavelength-tunable optical transmitter 24 has the same configuration as the first embodiment.

The upstream signal light sent to the parent node 100c is sorted by the wavelength router 152 according to the wavelength and input to the optical receiver 19 through the different optical transceivers-side ports. When each of the child nodes 200c sends the upstream signal light in which the identifier given to itself is embedded in the transmission frame, the parent node 100c can judge from which child node 200c the frame has been transmitted from the identifier in the received frame. As the wavelength router 152, there is used, for example, AWG in which the light having a wavelength of $\lambda_{U1}$ to $\lambda_{UM}$ input from each of the optical fiber-side ports #1 to #H is sorted into the optical transceivers-side ports #1 to #M according to the wavelength as shown in FIG. 19.

The coherent receiver described in FIG. 6 can be used as the optical receiver (19, 29) in the child node 200c and the parent node 100c. In this case, the output light wavelength of a local oscillation light source in the child node 200c is set close to the wavelength of allocated downstream signal light. Meanwhile, the output light wavelength of a local oscillation light source in the parent node 100c is changed according to the fact that the upstream signal light having arrived at the optical receiver is transmitted from which of the child nodes 200c. The application of coherent reception characterized by high receiving sensitivity can increase allowable loss in the optical fibers 250. The increase in transmission loss and branching loss allowed in the optical fibers 250 can extend the transmission distance and increase the number of the stored child nodes 200c.

Figure 9:
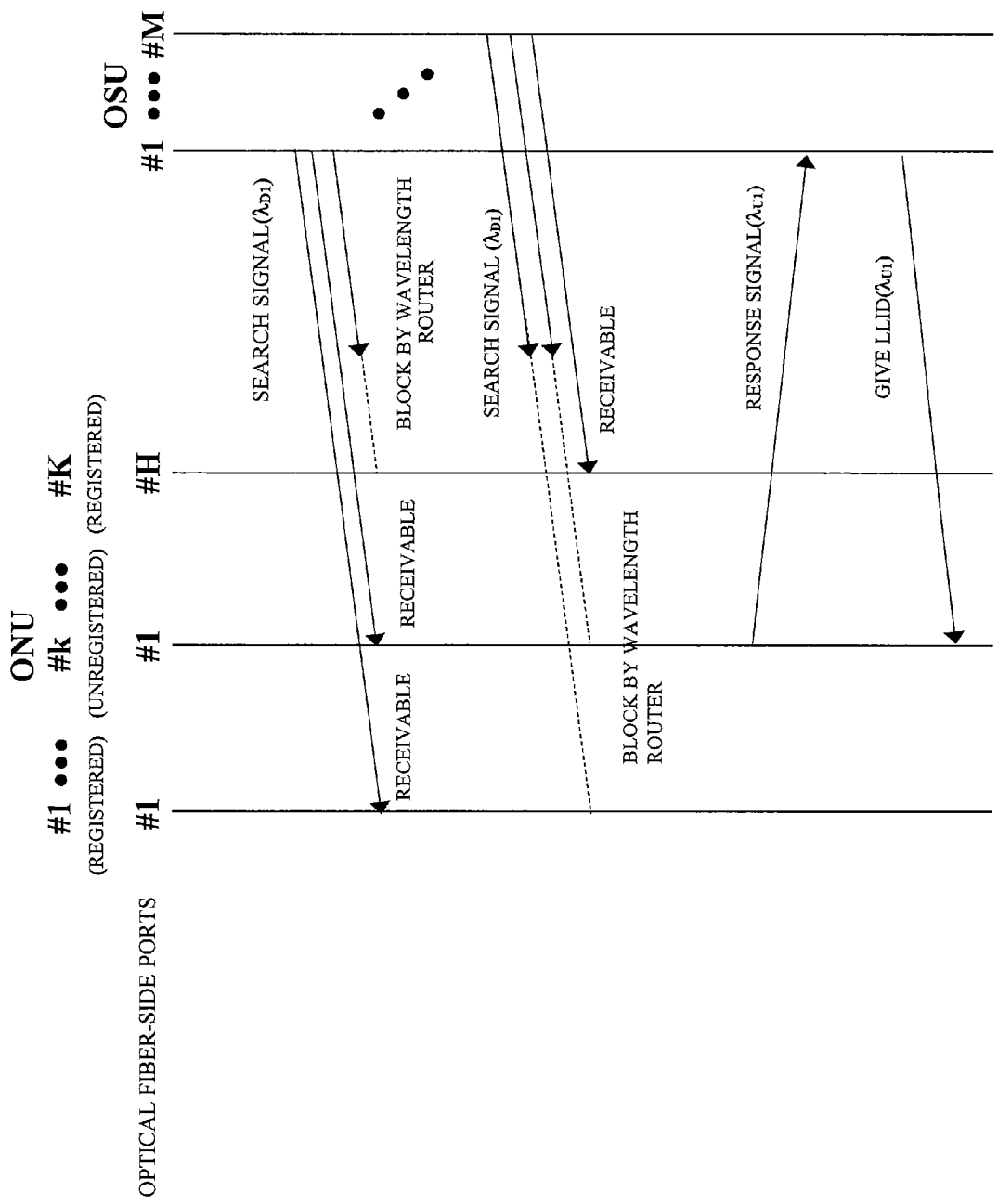
FIG. 9 is a view for explaining a discovery method according to the present invention.

FIG. 9 shows a procedure in which an identifier is given through a discovery process.

All or a plurality of the wavelength-tunable optical transmitters 18 in the parent node 100c send a search signal with a wavelength $\lambda_{Dm}$ at a predetermined time. When the number M of the optical transceiver-side ports and the number H of the optical fiber-side ports of the wavelength router 152 are equal to each other, all the wavelength-tunable optical transmitters 18 send the search signals, thereby the search signals can be output to the optical fibers 250 through all the optical fiber-side ports. When the number M of the optical transceiver-side ports is larger than the number H of the optical fiber-side ports, the H wavelength-tunable optical transmitters 18 send the search signals, thereby the search signals can be output to the optical fibers 250 through all the optical fiber-side ports.

The search signal includes an instruction indicating that a response signal as a registration request is transmitted when the received child node 200c is not registered in the parent node 100c and does not have an identifier. Here, when a coherent receiver is used as the optical receiver 29 in the child node 200c, a wavelength control circuit in the child node 200c is previously set so that the output light wavelength of the local oscillation light source in the unregistered child node 200c is set close to $\lambda_{Dm}$, thereby the unregistered child node 200c can reliably receive the search signal. When a child node is not registered, the unregistered child node can reliably receive the search signal by a method of periodically sweeping the output light wavelength in the local oscillation light source in the child node in a range of from $\lambda_{D\_1}$ to $\lambda_{D\_M}$. In the designation of the wavelength of the response signal, the search signal may include an instruction indicating that the wavelength of the response signal is $\lambda_{Un}$, or the wavelength control circuit in the child node 200c may be previously set so that the output light wavelength of the wavelength-tunable optical transmitter is set to $\lambda_{Un}$ when the search signal of $\lambda_{Dm}$ is received. The response signal transmitted to the parent node 100c is sorted by the wavelength router 152 according to the wavelength and then received by the optical receiver 19. In FIG. 9, although a response signal is output to an optical receiver from a port the same as the optical transceiver-side ports through which a search signal is input to the wavelength router 152, the response signal may be output from a different port. In FIG. 9, the LLID is used as the identifier.

When the parent node 100c receives the response signal as the registration request from the unregistered child node 200c as in the first embodiment, the parent node 100c gives the identifier to the child node 200c #k of a transmission source so as to prevent overlap with the already registered child nodes 200c. At the same time, the RTTs are calculated in all combinations of the downstream wavelengths and the upstream wavelengths, allocated to the child node 200c #k after the registration, from a time $T_k$ ($\lambda_{Dm}$, $\lambda_{Un}$) required for transmission and reception of the search signal and the response signal, and the management table of FIG. 17 is created.

In this embodiment, since the identifier given through the discovery process when the child node 200c is newly registered is fixedly given after the change of the allocated wavelength, and the management table shown in FIG. 17 in which the RTTs and the information of all the child nodes 200c are described is provided in the parent node 100c; therefore, it is not necessary to perform again the discovery process associated with the change of the allocated wavelength. Further, since FIG. 17 describes the RTTs in all the combinations of the downstream wavelengths and the upstream wavelengths allocated to the child nodes 200c, when the transmission timing of the upstream signal light of each of the child nodes 200c is determined, the parent node 100c can use high-precision RTTs information without depending on the allocated wavelength. Therefore, the bandwidth utilization efficiency can be enhanced by reducing a guard interval between the upstream signal lights from the different child nodes 200c.

[Third Embodiment]

Figure 10:
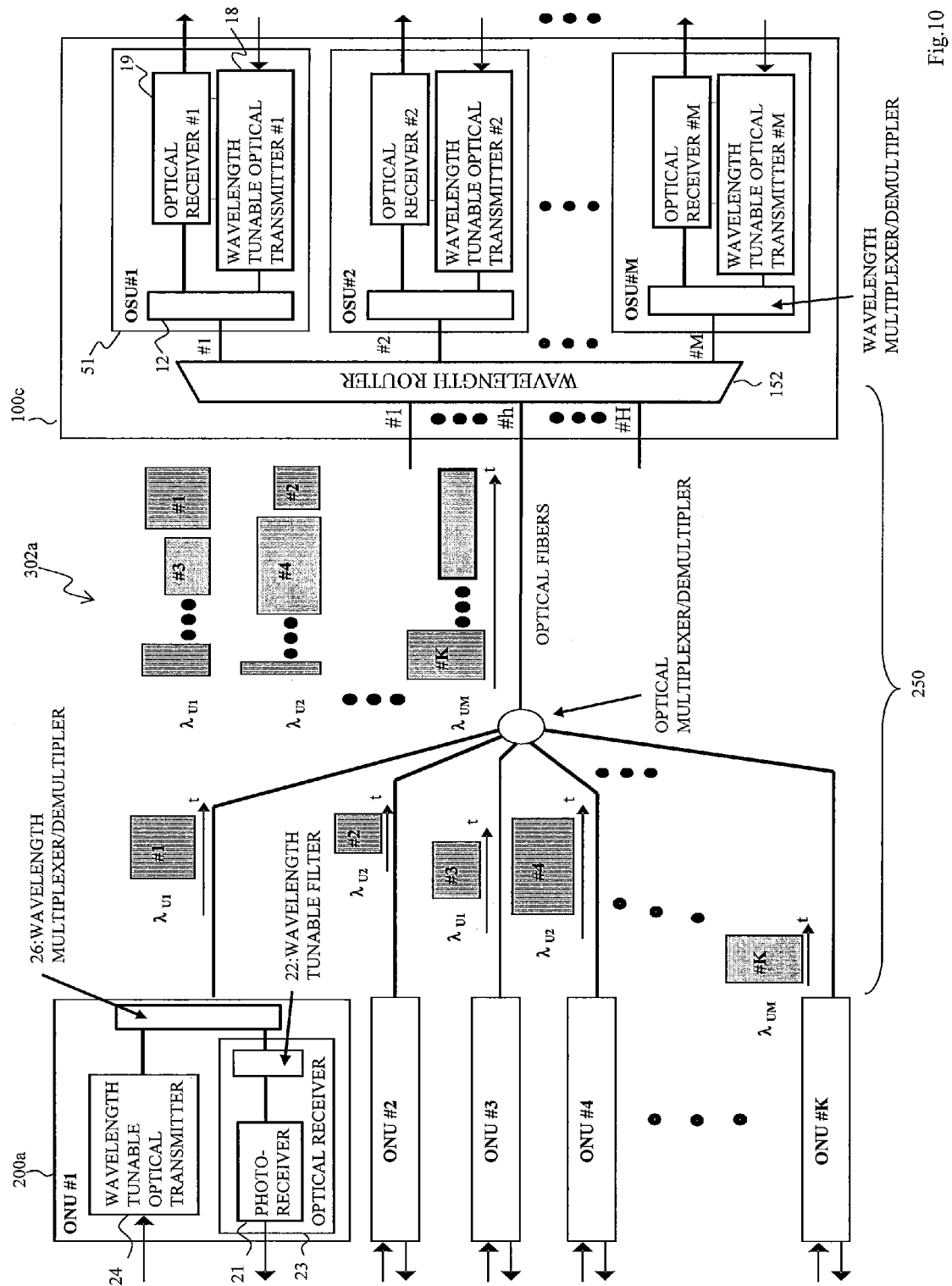
FIG. 10 is a view for explaining a configuration of wavelength-tunable WDM/TDM-PON.

FIG. 10 shows a configuration of wavelength-tunable WDM/TDM-PON which is an optical communication system 302a in a third embodiment. In the optical communication system 302a, the child node 200c of the second embodiment is replaced by the child node 200a of the first embodiment. Namely, in the child node 200a, a wavelength-tunable filter 22 is disposed on the preceding stage of a photoreceiver 21, and a transparent wavelength of the wavelength-tunable filter 22 is changed according to an allocated downstream wavelength, thereby downstream signal light having a desired wavelength is selectively received. The disposition of the wavelength-tunable filter 22 allows the downstream signal lights having different wavelengths to be wavelength-multiplexed and transmitted in optical fibers 250. Accordingly, a plurality of child nodes in a child node group connected to one optical fiber-side port of wavelength router 152 through the optical fibers 250 can receive the downstream signal light simultaneously.

The coherent receiver described in FIG. 6 may be used as the optical receiver (23, 19) in the child node 200a and the parent node 100c. In this case, the output light wavelength of a local oscillation light source in the child node is set close to the wavelength of allocated downstream signal light. Meanwhile, the output light wavelength of a local oscillation light source in the parent node is changed according to the fact that the upstream signal light having arrived at the optical receiver is transmitted from which of the child nodes. The application of coherent reception characterized by high receiving sensitivity can increase allowable loss in the optical fibers 250. The increase in transmission loss and branching loss allowed in the optical fibers 250 can extend the transmission distance and increase the number of the stored child nodes.

As in the second embodiment, an identifier such as LLID given through the discovery process is fixedly given to each of the child nodes 200a regardless of the change of the allocated wavelength, and the parent node 100c is provided with the management table shown in FIG. 17 in which the correspondence between the child nodes 200a and the identifiers as well as the RTTs of a frame with each of the child nodes 200a in all the combinations of the allocated wavelengths are recorded. In FIG. 17, the LLID is used as the identifier.

The management table shown in FIG. 17 is created as in the second embodiment through the discovery process. Here, when the child node 200a is not registered, a wavelength control circuit in the child node 200a is previously set so that the transparent wavelength of the wavelength-tunable filter 22 in the child node 200a or the output light wavelength of a local oscillation light source (not shown) is $\lambda_{Dm}$, thereby the unregistered child node 200a can reliably receive the search signal. Further, when the child node is not registered, a method of periodically sweeping the transparent wavelength of the wavelength-tunable filter 22 in the child node or the output light wavelength of the local oscillation light source in a range of from $\lambda_{D\_1}$ to $\lambda_{D\_M}$ is used, thereby the unregistered child node can reliably receive the search signal.

In this embodiment, the identifier given through the discovery process when the child node 200a is newly registered is fixedly given after the change of the allocated wavelength, and the management table shown in FIG. 17 in which the RTTs and the information of all the child nodes 200a are described is provided in the parent node 100c; therefore, it is not necessary to perform again the discovery process associated with the change of the allocated wavelength. Further, since FIG. 17 describes the RTTs in all the combinations of the downstream wavelengths and the upstream wavelengths allocated to the child nodes 200a, when the transmission timing of the upstream signal light of each of the child nodes 200a is determined, the parent node 100c can use high-precision RTTs information without depending on the allocated wavelength. Therefore, the bandwidth utilization efficiency can be enhanced by reducing a guard interval between the upstream signal lights from the different child nodes 200a.

[Fourth Embodiment]

Although an optical communication system of this embodiment has the same configuration as the optical communication system (FIGS. 3, 4, and 6) described in the first embodiment, a parent node sends a search signal with all wavelengths $\lambda_{D1}$ to $\lambda_{DM}$ in the discovery. Namely, a parent node 100a has optical transceivers 51 in which at least one of downstream wavelengths can be set of among the wavelengths of $\lambda_{D1}$ to $\lambda_{DM}$ and optical multiplexer/demultiplexer 151 which is connected to the optical transceivers 51, outputs the downstream signals from the optical transceivers to optical fibers 250, outputs the upstream signals from the optical fibers 250 to the optical transceivers 51, and the controller controls at least one of the optical transceivers 51 to send search signals on several downstream wavelengths and, executes the above-described discovery method, using a response signal received by any one of the optical transceivers 51.

As in the first embodiment, an identifier such as LLID given through the discovery process is fixedly given to each of the child nodes (200a, 200b) regardless of the change of the allocated wavelength, and the parent node (100a, 100b) is provided with the management table shown in FIG. 17 in which the correspondence between the individual child nodes (200a, 200b) and the identifiers as well as the RTTs of a frame with each of the child nodes (200a, 200b) in all the combinations of the allocated wavelengths are recorded. In FIG. 17, the LLID is used as the identifier.

Figure 11:
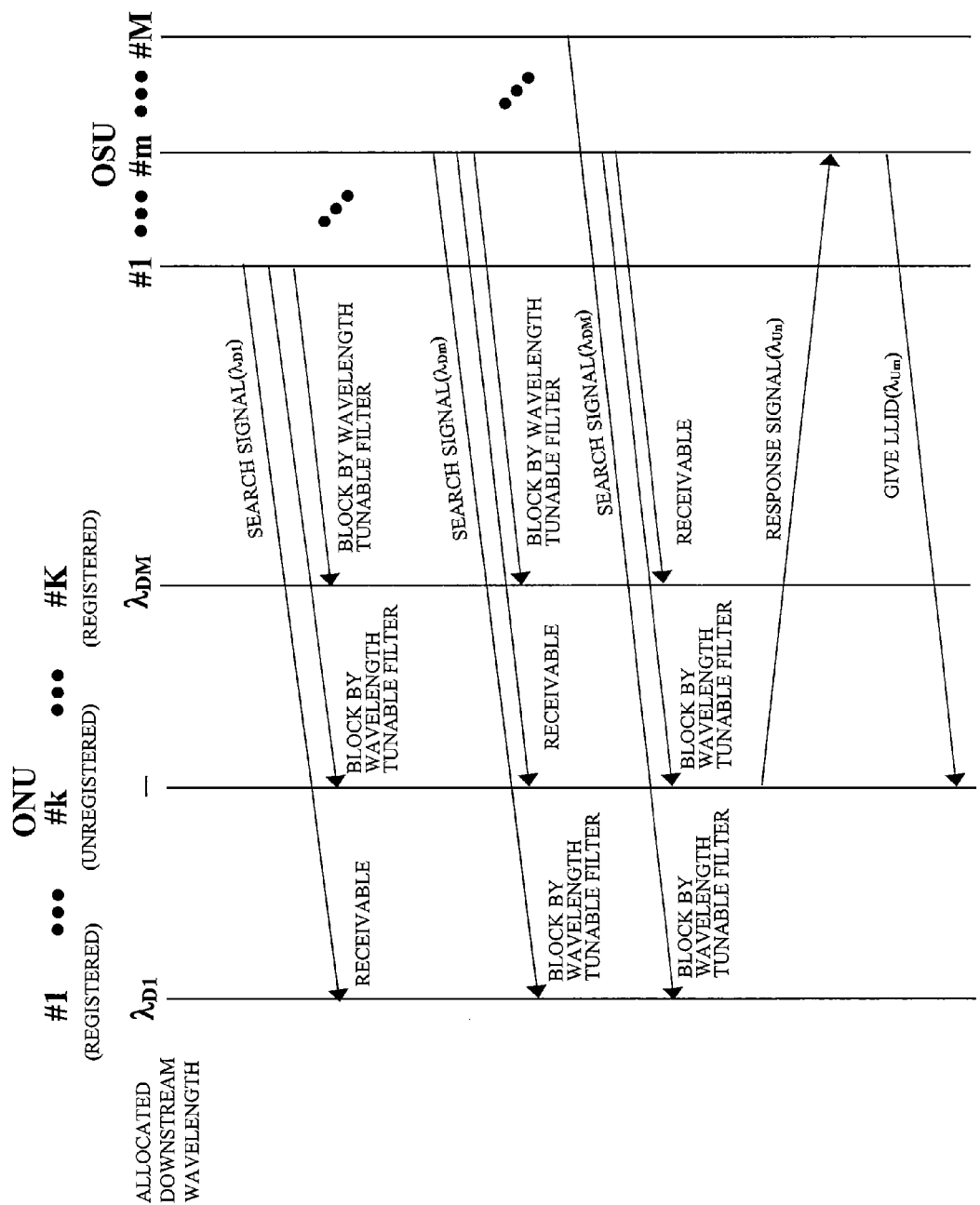
FIG. 11 is a view for explaining a discovery method according to the present invention.

FIG. 11 shows a procedure in which an identifier is given through a discovery process.

All optical transmitters 11 in the parent node (100a, 100b) send the search signals with different wavelengths at a predetermined time. The search signal includes an instruction indicating that a response signal as a registration request is sent when the received child node (200a, 200b) is not registered in the parent node (100a, 100b) and does not have an identifier. Here, when the child node (200a, 200b) is not registered, a wavelength control circuit in the child node (200a, 200b) is previously set so that the transparent wavelength of the wavelength-tunable filter 22 in the child node (200a, 200b) or the output light wavelength of a local oscillation light source 28 is any one of $\lambda_{D1}$ to $\lambda_{DM}$, thereby the unregistered child node (200a, 200b) can reliably receive the search signal. Further, when the child node is not registered, a method of periodically sweeping the transparent wavelength of the wavelength-tunable filter 22 in the child node or the output light wavelength of the local oscillation light source in a range of from $\lambda_{D\_1}$ to $\lambda_{D\_M}$ is used, thereby the unregistered child node can reliably receive the search signal. In the designation of the wavelength of the response signal, the search signal may include an instruction indicating that the wavelength of the response signal is any one of $\lambda_{U1}$ to $\lambda_{UM}$, or the wavelength control circuit in the child node may be previously set so that the output light wavelength of the wavelength-tunable optical transmitter 24 is set to $\lambda_{Un}$ (n=1, 2, . . . , and M) when the search signal of $\lambda_{Dm}$ is received. The response signal sent to the parent node (100a, 100b) is output by the optical multiplexer/demultipler 151 and then received by an optical receiver 15 #n or a coherent receiver 16 #n. In FIG. 11, although m=n, it may be that m≠n. In FIG. 11, the LLID is used as the identifier.

Figure 12:
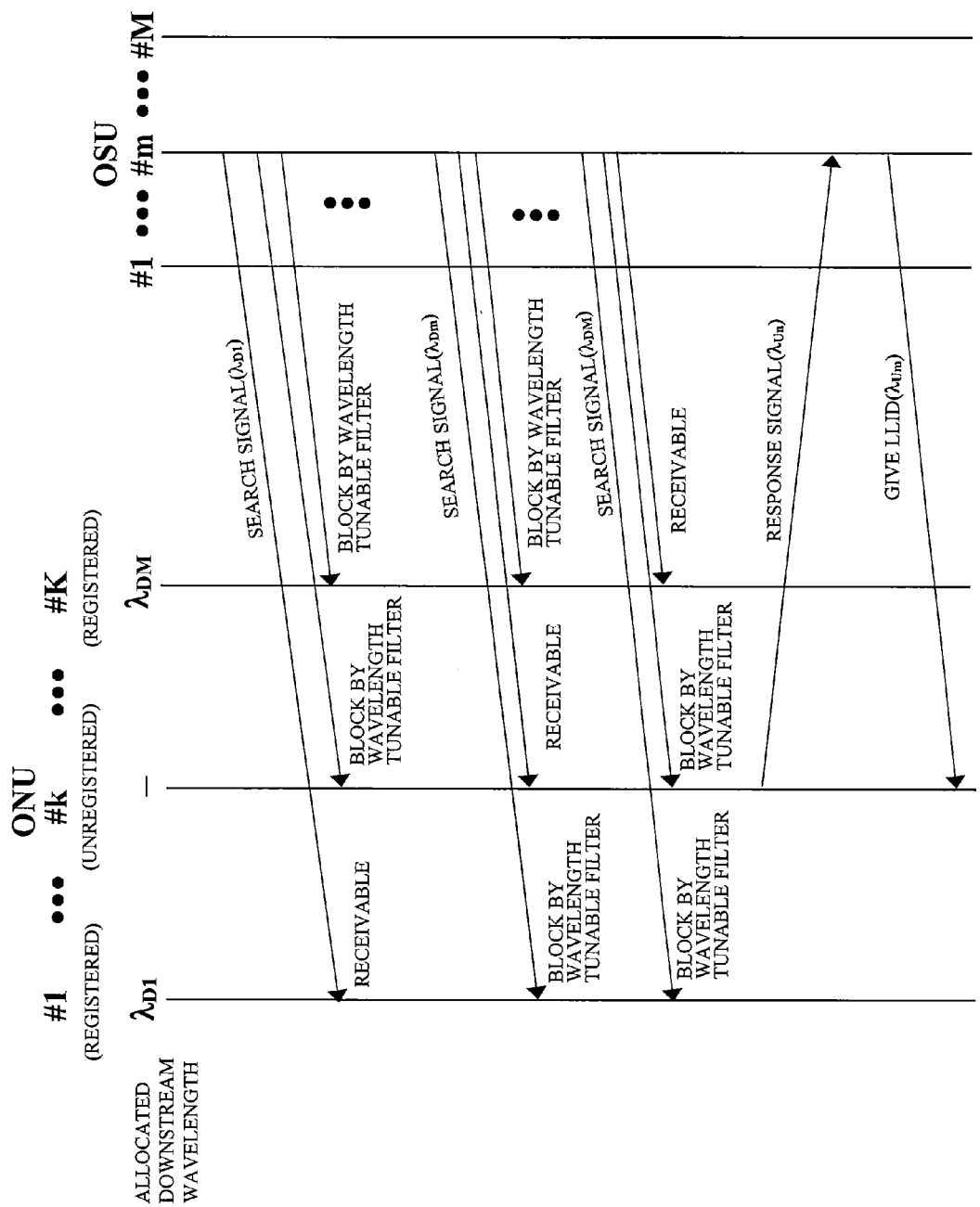
FIG. 12 is a view for explaining a discovery method according to the present invention.

In FIG. 11, the search signals with wavelengths of $\lambda_{D1}$ to $\lambda_{DM}$ are sent by using all the optical transmitters 11 in the parent node (100a, 100b); however, as shown in FIG. 12, arbitrary one of the optical transmitters 11 may time-multiplex and transmit the search signals with wavelengths of $\lambda_{D1}$ to $\lambda_{DM}$. In this case, the optical transmitter 11 transmitting at least the search signal is a wavelength-tunable optical transmitter which can send the downstream signal light with wavelengths of $\lambda_{D1}$ to $\lambda_{DM}$.

When the parent node (100a, 100b) receives the response signal as the registration request from the unregistered child node (200a, 200b) #k, as in the first embodiment, the parent node (100a, 100b) gives the identifier to the child node #k of a transmission source so as to prevent overlap with the already registered child nodes (200a, 200b). At the same time, the RTTs are calculated in all combinations of the downstream wavelengths and the upstream wavelengths, allocated to the child node (200a, 200b) #k after the registration, from a time $T_k$ ($\lambda_{Dm}$, $\lambda_{Un}$) required for transmission and reception of the search signal and the response signal, and the management table of FIG. 17 is created.

In this embodiment, the identifier given through the discovery process when the child node (200a, 200b) is newly registered is fixedly given after the change of the allocated wavelength, and the management table shown in FIG. 17 in which the RTTs and the information of all the child nodes (200a, 200b) are described is provided in the parent node (100a, 100b); therefore, it is not necessary to perform again the discovery process associated with the change of the allocated wavelength. Further, since FIG. 17 describes the RTTs in all the combinations of the downstream wavelengths and the upstream wavelengths allocated to the child nodes (200a, 200b), when the transmission timing of the upstream signal light of each of the child nodes (200a, 200b) is determined, the parent node (100a, 100b) can use high-precision RTTs information without depending on the allocated wavelength. Therefore, the bandwidth utilization efficiency can be enhanced by reducing the guard interval between the upstream signal lights from the different child nodes (200a, 200b).

[Fifth Embodiment]

Although an optical communication system of this embodiment has the same configuration as the optical communication system (FIG. 8) described in the second embodiment and the optical communication system (FIG. 10) described in the third embodiment, a parent node sends a search signal with all or a plurality of wavelengths $\lambda_{D1}$ to $\lambda_{DM}$ in the discovery. Namely, a parent node 100c has optical transceivers 51 in which downstream wavelengths of $\lambda_{D1}$ to $\lambda_{DM}$ can be set and wavelength router 152 which is connected to each of the optical transceivers 51 through optical transceiver-side ports, outputs the downstream signals from the optical transceiver-side ports, to different optical fiber-side ports according to downstream wavelengths, is connected to the optical fibers 250 through optical fiber-side ports, outputs the upstream signals from the optical fiber-side ports to the different optical transceiver-side ports according to upstream wavelengths, and the controller controls one of the optical transceiver 51 to send search signals on several downstream wavelengths and executes the above-described discovery method, using a response signal received at the optical transceivers 51.

As in the second embodiment, an identifier such as LLID given through the discovery process is fixedly given to each of the child nodes 200c regardless of the change of the allocated wavelength, and the parent node 100c is provided with the management table shown in FIG. 17 in which the correspondence between the child nodes 200c and the identifiers as well as the RTTs of a frame with each of the child nodes 200c in all the combinations of the allocated wavelengths are recorded. In FIG. 17, the LLID is used as the identifier.

Figure 13:
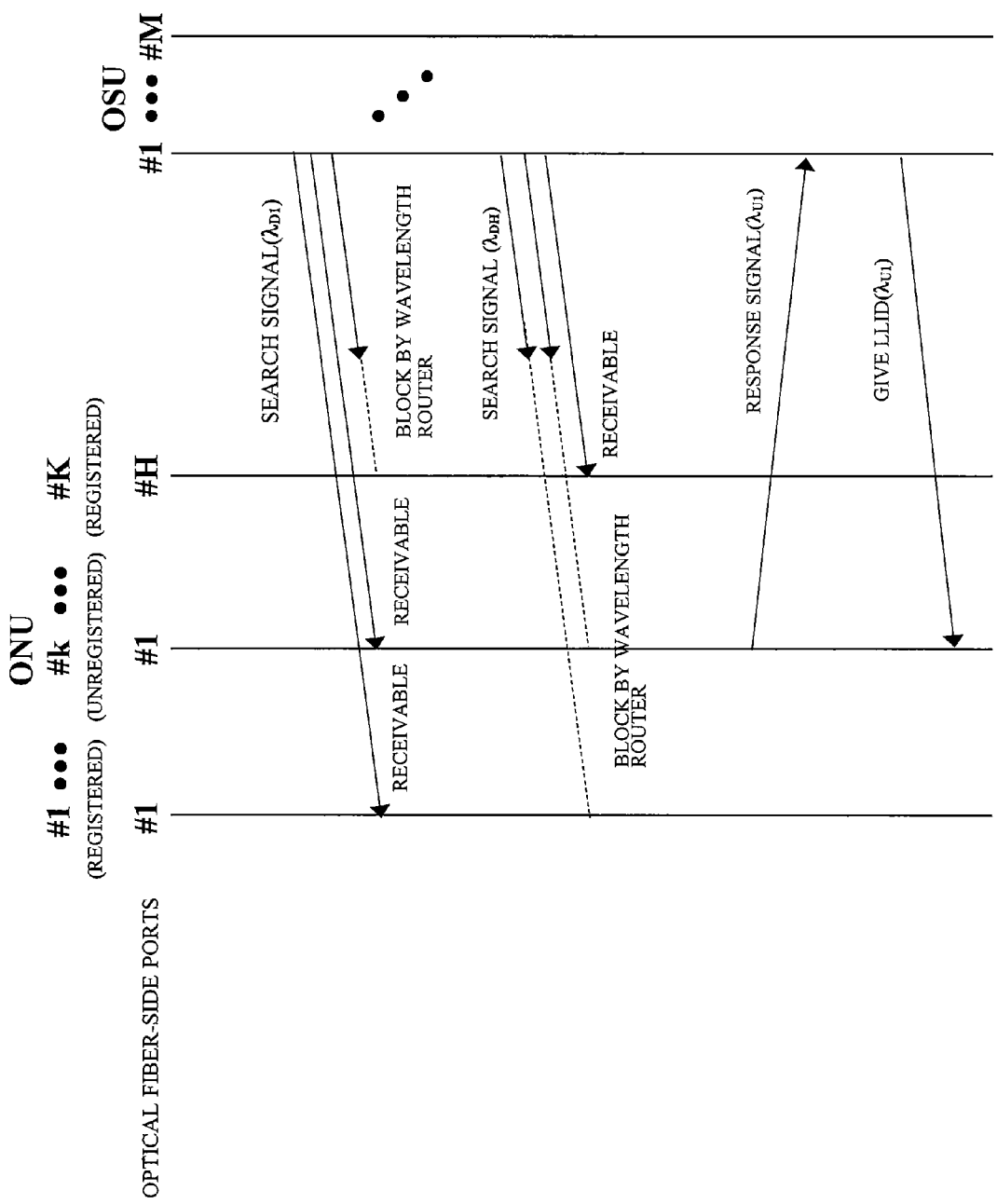
FIG. 13 is a view for explaining a discovery method according to the present invention.

FIG. 13 shows a procedure in which an identifier is given through a discovery process.

Arbitrary one of the optical transmitters 18 in the parent node 100c time-multiplexes and sends a search signal with all or a plurality of wavelengths $\lambda_{D1}$ to $\lambda_{DM}$. When the number M of the optical transceiver-side ports and the number H of the optical fiber-side ports of the wavelength router 152 are equal to each other, the search signals are sent with all of the wavelengths $\lambda_{D1}$ to $\lambda_{DM}$, thereby the search signals can be output to the optical fibers 250 through all the optical fiber-side ports. When the number M of the optical transceiver-side ports is larger than the number H of the optical fiber-side ports, the search signals are sent with the H wavelengths of the $\lambda_{D1}$ to $\lambda_{DM}$, thereby the search signals can be output to the optical fibers 250 through all the optical fiber-side ports.

The search signal includes an instruction indicating that a response signal as a registration request is sent when the received child node 200c is not registered in the parent node 100c and does not have an identifier. In the optical communication system of FIG. 10, the unregistered child node 200c can reliably receive the search signal by a method of periodically sweeping the transparent wavelength of the wavelength-tunable filter 22 or the output light wavelength of the local oscillation light source in a range of from $\lambda_{D\_1}$ to $\lambda_{D\_M}$. In the designation of the wavelength of the response signal, the search signal may include an instruction indicating that the wavelength of the response signal is $\lambda_{Un}$, or a wavelength control circuit in the child node 200c may be previously set so that the output light wavelength of the wavelength-tunable optical transmitter 24 is set to $\lambda_{Un}$ when the search signal of $\lambda_{Dm}$ is received. The response signal transmitted to the parent node 100c is sorted by the wavelength router 152 according to the wavelength and then received by the optical receiver 19. In FIG. 13, although a response signal is output to the optical receiver 19 from a ports the same as the optical transceiver-side ports through which a search signal is input to the wavelength router 152, the response signal may be output from a different ports. In FIG. 13, the LLID is used as the identifier.

When the parent node 100c receives the response signal as the registration request from the unregistered child node 200c #k, as in the second embodiment, the parent node 100c gives the identifier to the child node 200c #k of a transmission source so as to prevent overlap with the already registered child nodes 200c. At the same time, the RTTs are calculated in all combinations of the downstream wavelengths and the upstream wavelengths, allocated to the child node 200c #k after the registration, from a time $T_k$ ($\lambda_{Dm}$, $\lambda_{Un}$) required for transmission and reception of the search signal and the response signal, and the management table of FIG. 17 is created.

In this embodiment, the identifier given through the discovery process when the child node 200c is newly registered is fixedly given after the change of the allocated wavelength, and the management table as shown in FIG. 17 in which the RTTs and the information of all the child nodes 200c are described is provided in the parent node 100c; therefore, it is not necessary to perform again the discovery process associated with the change of the allocated wavelength. Further, since FIG. 17 describes the RTTs in all the combinations of the downstream wavelengths and the upstream wavelengths allocated to the child nodes 200c, when the transmission timing of the upstream signal light of each of the child nodes 200c is determined, the parent node 100c can use high-precision RTTs information without depending on the allocated wavelength. Therefore, the bandwidth utilization efficiency can be enhanced by reducing the guard interval between the upstream signal lights from the different child nodes 200c.

[Sixth Embodiment]

Figure 14:
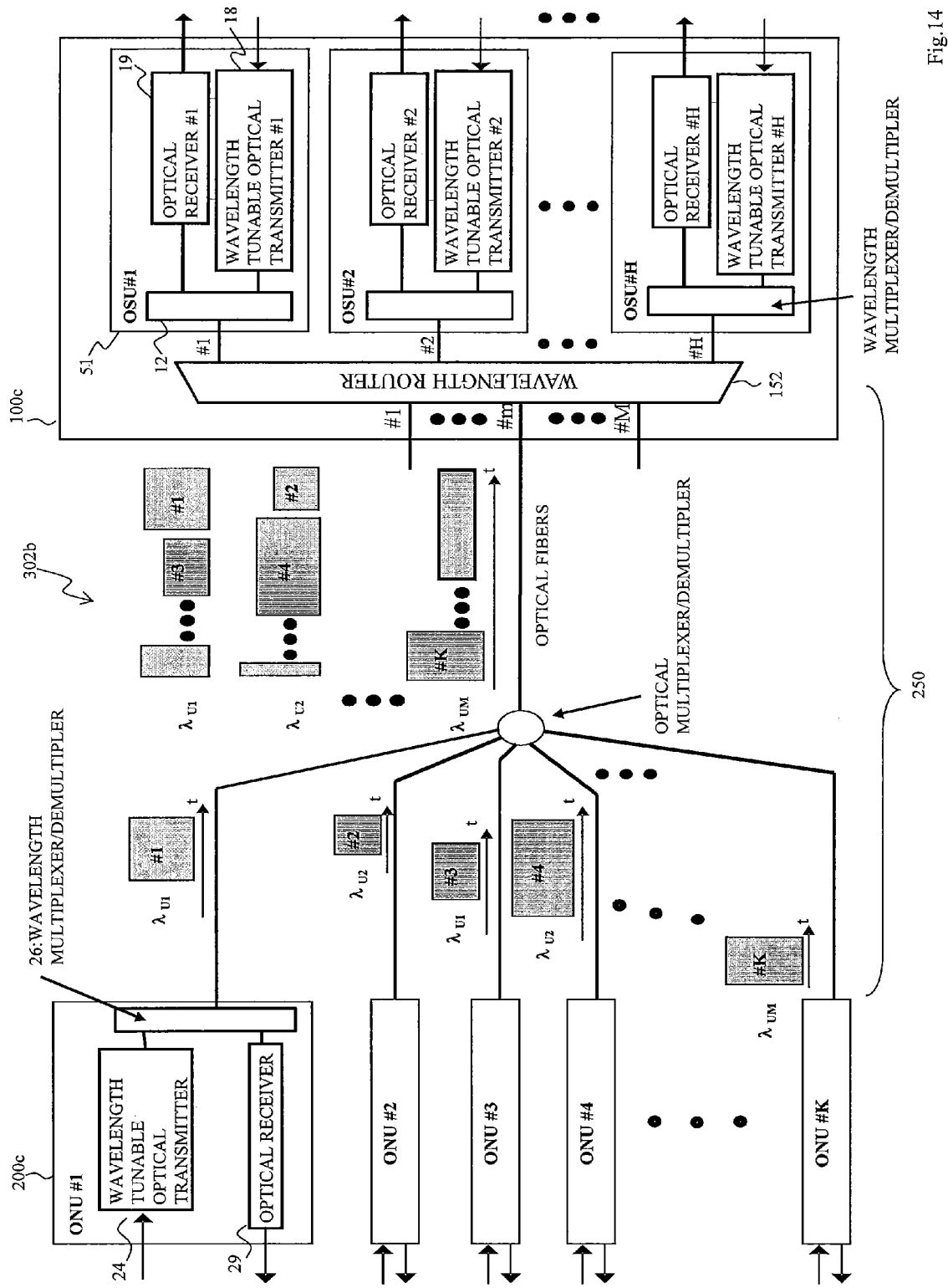
FIG. 14 is a view for explaining a configuration of wavelength-tunable WDM/TDM-PON.

FIG. 14 shows a configuration of wavelength-tunable WDM/TDM-PON which is an optical communication system in a sixth embodiment. The configuration of this wavelength-tunable WDM/TDM-PON is different from the configuration of the wavelength-tunable WDM/TDM-PON in the fifth embodiment in that the number M of the optical fiber-side ports of the wavelength router 152 in the parent node is larger than the number H of the optical fiber-side ports. Input/output relationships of downstream signal light and upstream signal light in wavelength router 152 are shown in FIGS. 20 and 21. As in the fifth embodiment, an identifier such as LLID given through a discovery process is fixedly given to each of the child nodes 200c regardless of the change of the allocated wavelength, and the parent node 100c is provided with the management table shown in FIG. 17 in which the correspondence between the child nodes 200c and the identifiers and the RTTs of a frame between the parent node 100c and the child nodes 200c in all the combinations of the allocated wavelengths are recorded. In FIG. 17, the LLID is used as the identifier.

Figure 15:
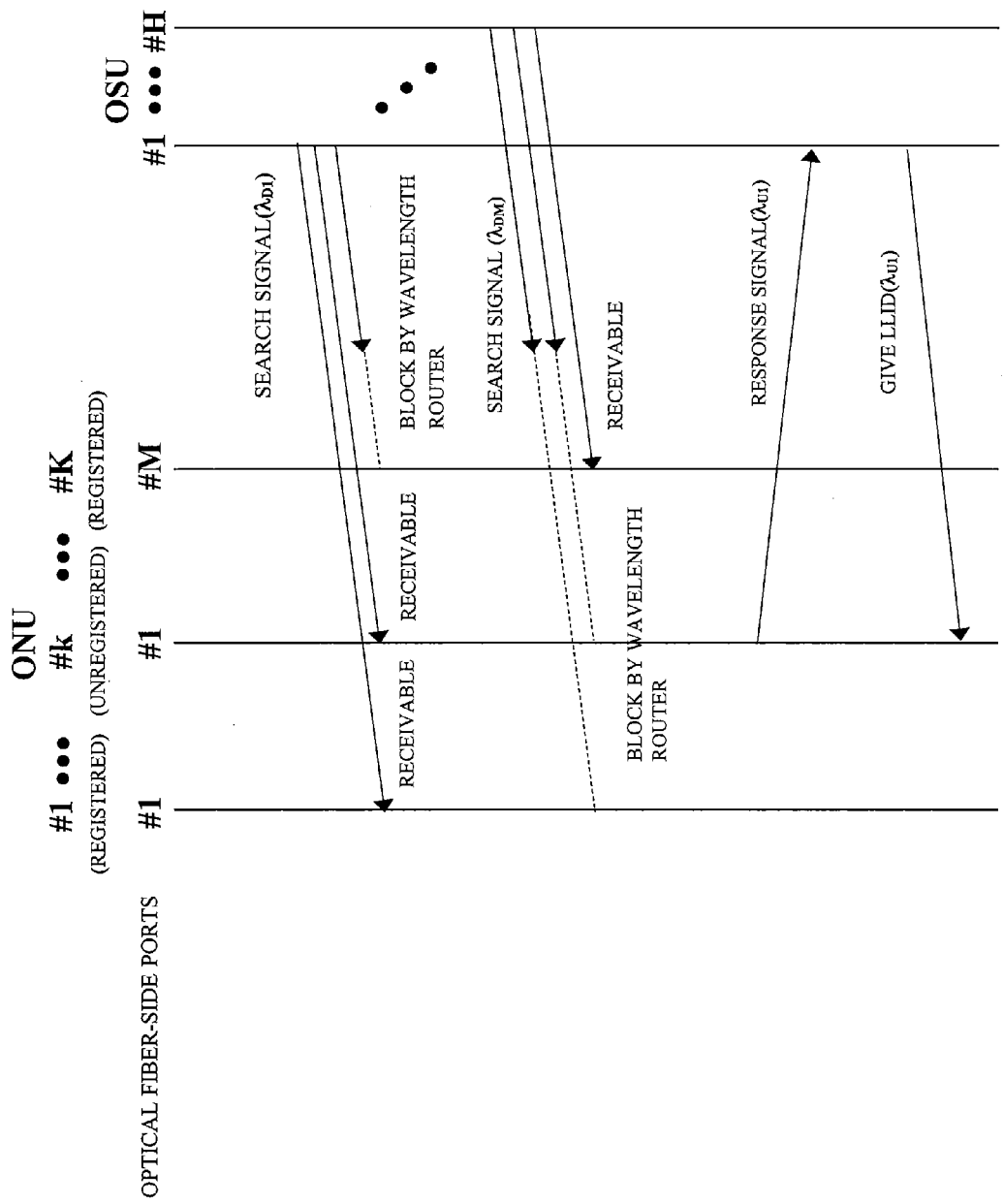
FIG. 15 is a view for explaining a discovery method according to the present invention.

FIG. 15 shows a procedure in which an identifier is given through a discovery process.

Arbitrary one of optical transmitters in the parent node 100c time-multiplexes and transmits search signals with wavelengths of $\lambda_{D1}$ to $\lambda_{DM}$. Consequently, the search signals can be output to optical fibers 250 through all optical fiber-side ports.

The search signal includes an instruction indicating that a response signal as a registration request is sent when the received child node 200c is not registered in the parent node 100c and does not have an identifier. In the optical communication system of FIG. 10, the unregistered child node 200c can reliably receive the search signal by a method of periodically sweeping the transparent wavelength of the wavelength-tunable filter 22 or the output light wavelength in the local oscillation light source in a range of from $\lambda_{D\_1}$ to $\lambda_{D\_M}$. In the designation of the wavelength of the response signal, the search signal may include an instruction indicating that the wavelength of the response signal is $\lambda_{Un}$, or a wavelength control circuit in the child node 200c may be previously set so that the output light wavelength of the wavelength-tunable optical transmitter 24 is set to $\lambda_{Un}$ when the search signal of $\lambda_{Dm}$ is received. The response signal transmitted to the parent node 100c is sorted by the wavelength router 152 according to the wavelength and then received by the optical receiver 19. In FIG. 15, although a response signal is output to the optical receiver from a ports the same as the optical transceiver-side ports through which a search signal is input to the wavelength router 152, the response signal may be output from a different port. FIG. 15, the LLID is used as the identifier.

When the parent node 100c receives the response signal as the registration request from the unregistered child node 200c #k, as in the second embodiment, the parent node 100c gives the identifier to the child node 200c #k of a transmission source so as to prevent overlap with the already registered child nodes 200c. At the same time, the RTTs are calculated in all combinations of the downstream wavelengths and the upstream wavelengths, allocated to the child node 200c #k after the registration, from a time $T_k$ ($\lambda_{Dm}$, $\lambda_{Un}$) required for transmission and reception of the search signal and the response signal, and the management table of FIG. 17 is created.

In this embodiment, the identifier given through the discovery process when the child node 200c is newly registered is fixedly given after the change of the allocated wavelength, and the management table shown in FIG. 17 in which the RTTs and the information of all the child nodes 200c are described is provided in the parent node 100c; therefore, it is not necessary to perform again the discovery process associated with the change of the allocated wavelength. Further, since FIG. 17 describes the RTTs in all the combinations of the downstream wavelengths and the upstream wavelengths allocated to the child nodes 200c, when the transmission timing of the upstream signal light of each of the child nodes 200c is determined, the parent node 100c can use high-precision RTTs information without depending on the allocated wavelength. Therefore, the bandwidth utilization efficiency can be enhanced by reducing the guard interval between the upstream signal lights from the different child nodes 200c.

In the following description, the discovery method, the optical communication method, and the optical communication system of this embodiment will be explained.

(1): A discovery method in which in an optical communication system in which one parent node and child nodes are connected through optical fibers 250, the parent node sends downstream signal light with wavelengths of $\lambda_{D1}$ to $\lambda_{DM}$ (M is an integer not less than 2) and receives upstream signal lights with wavelengths of $\lambda_{U1}$ to $\lambda_{UN}$ (N is an integer not less than 2), one of the wavelengths $\lambda_{D1}$ to $\lambda_{DM}$ and one of the wavelengths $\lambda_{U1}$ to $\lambda_{UN}$ upstream wavelengths are allocated from the parent node as a downstream wavelength and an upstream wavelength, respectively, to the child node already registered in the parent node among the child nodes, the child node receives the downstream signal light having the same wavelength as the allocated downstream wavelength, and the upstream signal light is sent with the allocated upstream wavelength, the child node unregistered in the parent node among the child nodes is registered, the parent node sends a search signal toward all the child nodes, when the child node unregistered in the parent node among the child nodes receives the search signal, the child node sends a response signal toward the parent node, when the parent node receives the response signal, the parent node registers the child node of a transmission source while corresponding the child node to a unique identifier for each child node, and a frame round trip time between the parent node and the child node is stored in all combinations of the downstream wavelengths and the upstream wavelengths, allocated to the child node after the registration, from a time required for transmission and reception of the search signal and the response signal.

(2): The discovery method described in (1) characterized in that the round trip time in all combinations of the downstream wavelengths and the upstream wavelengths allocated to the child node is calculated from the time required for transmission and reception of the search signal and the response signal, using a wavelength dependency of the refractive index in the optical fibers 250.

(3): The discovery method described in (1) or (2) characterized in that the parent node sends the search signal with a single wavelength, and the child node unregistered in the parent node can receive the search signal.

(4): The discovery method described in (3) characterized in that in the optical communication system in which the parent node is provided with optical transceivers and optical multiplexer/demultipler 151, optical transceivers send and receive signal light with a unique wavelength for each of the optical transceivers, and the optical multiplexer/demultipler 151 is a parent node which is connected to each of the optical transceivers and wavelength-multiplexes downstream signal lights with different wavelengths from optical transceivers and outputs the downstream signal lights to the optical fibers 250, one of the optical transceivers sends the search signal with the single wavelength, and the response signal sent by the child node is output by the optical multiplexer/demultipler 151 and then received at the optical transceivers.

(5): The discovery method described in (3) characterized in that in the optical communication system in which the parent node is provided with optical transceivers and wavelength router 152, optical transceivers can send/receive signal lights with wavelengths of $\lambda_{D1}$ to $\lambda_{DM}$/$\lambda_{U1}$ to $\lambda_{UN}$, the wavelength router 152 is connected to each of the optical transceivers through separate optical transceivers-side ports, and the downstream signals light from optical transceivers are output from different optical fiber-side ports according to the wavelength to the optical fibers 250, all or a plurality of the optical transceivers send the search signal with the single wavelength, the response signal sent by the child node is received at the optical transceivers through the different optical transceivers-side ports in the wavelength router 152.

(6): The discovery method according to (1) or (2) characterized in that the parent node sends the search signal with all or a plurality of wavelengths $\lambda_{D1}$ to $\lambda_{DM}$, and the child node unregistered in the parent node can receive the search signal having at least one wavelength among all or the plurality of wavelengths $\lambda_{D1}$ to $\lambda_{DM}$.

(7): The discovery method described in (6) characterized in that in the optical communication system in which the parent node is provided with optical transceivers and optical multiplexer/demultipler 151, optical transceivers send and receive signal light with a unique wavelength for each of the optical transceivers, and the optical multiplexer/demultipler 151 which is connected to the optical transceivers and wavelength-multiplexes the downstream signal lights with different wavelengths from optical transceivers and outputs the downstream signals to the optical fibers 250, the search signal with a wavelength of $\lambda_{D1}$ to $\lambda_{DM}$ is sent using at least one of the optical transceivers, when the optical transceivers sending the search signal include the optical transceivers sending the search signals using a plurality of wavelengths, at least the optical transceiver can change a transmission light wavelength, the optical transceivers time-multiplexes and sends the search signal with wavelengths, and the response signal sent by the child node is output by the optical multiplexer/demultipler 151 and then received at the optical transceivers.

(8): The discovery method described in (6) characterized in that in the optical communication system in which the parent node is provided with optical transceivers and wavelength router 152, the plurality of optical transceivers can send/receive signal light with wavelengths of $\lambda_{D1}$ to $\lambda_{DM}$/$\lambda_{U1}$ to $\lambda_{UN}$, the wavelength router 152 is connected to each of the optical transceivers through separate optical transceivers-side ports, and the downstream signal lights from the plurality of optical transceivers are output from different optical fiber-side ports according to the wavelength to the optical fibers 250, the optical transceiver time-multiplexes and sends the search signal with all or a plurality of wavelengths $\lambda_{D1}$ to $\lambda_{DM}$, and the response signal sent by the child node is received at the optical transceivers through the different optical transceiver-side-side ports according to the wavelength in the wavelength router 152.

(9): An optical communication method of an optical communication system in which one parent node and child nodes are connected through an optical fibers 250, the parent node sends downstream signal light with a wavelength of $\lambda_{D1}$ to $\lambda_{DM}$ (M is an integer not less than 2) and receives upstream signals light with wavelengths of $\lambda_{U1}$ to $\lambda_{UN}$ (N is an integer not less than 2), one of the wavelengths $\lambda_{D1}$ to $\lambda_{DM}$ and one of the wavelengths $\lambda_{U1}$ to $\lambda_{UN}$ upstream are allocated from the parent node as a downstream wavelength and an upstream wavelengths, respectively to the child node, and the child node receives the downstream signal light with the same wavelength as the allocated downstream wavelength and sends the signal light with the allocated upstream wavelength, this optical communication method is characterized by including a procedure in which a frame length and a transmission time of the upstream signal light are determined by considering a round trip time of a frame between the parent node and the child nodes storing all combinations of the downstream wavelengths and the upstream wavelengths allocated to each of the child nodes so as to prevent collision between the signal lights, sent by the different child nodes to which the same upstream wavelength is allocated, in the parent node, a procedure in which the parent node notifies the child node of the frame length and the transmission time of the upstream signal light, and a procedure for sending the upstream signal light, that is the frame length notified from the parent node, at the transmission time, notified from the parent node, in the child node.

(10): An optical communication system in which one parent node and child nodes are connected through an optical fibers 250, the parent node sends downstream signal light with a wavelength of $\lambda_{D1}$ to $\lambda_{DM}$ (M is an integer not less than 2) and receives upstream signal light with a wavelength of $\lambda_{U1}$ to $\lambda_{UN}$ (N is an integer not less than 2), one of the wavelengths $\lambda_{D1}$ to $\lambda_{DM}$ and one of the wavelengths $\lambda_{U1}$ to $\lambda_{UN}$ upstream wavelength are allocated from the parent node as a downstream wavelength and an upstream wavelengths, respectively to the child node, and the child node receives the downstream signal light with the same wavelength as the allocated downstream wavelength and sends the upstream signal light with the allocated upstream wavelength, and in this optical communication system, a unique identifier for each child node is fixedly given to each of the child nodes, and the parent node is provided with a management table in which a correspondence between the child nodes and the identifiers and a round trip time of a frame between the parent node and the child nodes in all the combinations of the downstream wavelengths and the upstream wavelengths allocated to each of the child nodes are recorded.

(11): The optical communication system described in (10) characterized in that the child node sends the upstream signal light, that is a frame length notified from the parent node, at a transmission time notified from the parent node, and notification from the parent node is determined by the parent node while considering the round trip time described in the management table so as to prevent collision between the upstream signal light from the different child nodes to which the same upstream wavelength is allocated.

(12): The optical communication system described in (10) or (11) characterized in that the parent node is provided with optical transceivers and optical multiplexer/demultipler 151, optical transceivers send and receive the downstream signal light with a unique wavelength for each of the optical transceivers, and the optical multiplexer/demultiper 151 is connected to each of the optical transceivers, wavelength-multiplexes downstream signal lights with different wavelengths from optical transceivers, and outputs the downstream signal lights to the optical fibers 250, and the upstream signal light sent by the child node is output by the optical multiplexer/demultiper 151 and then received at the optical transceivers.

(13): The optical communication system described in (10) or (11) characterized in that in the optical communication system in which the parent node is provided with a optical transceivers and wavelength router 152, optical transceivers can send/receive signal light with wavelengths of $\lambda_{D1}$ to $\lambda_{DM}$/$\lambda_{U1}$ to $\lambda_{UN}$, the wavelength router 152 is a parent node which is connected to each of the optical transceivers through separate optical transceiver-side ports and outputs the downstream signal light, sent from the optical transceivers, from different optical fiber-side ports according to the wavelength to the optical fibers 250, the upstream signal light sent by the child node is received at the optical transceivers through the different optical transceiver-side ports according to the wavelength in the wavelength router 152.

REFERENCE SIGNS LIST

11: optical transmitter
12: wavelength multiplexer/demultipler
13: wavelength filter
14: photoreceiver
15: optical receiver
16: coherent receiver
17: local oscillation light source
18: wavelength-tunable optical transmitter
19: optical receiver
21: photoreceiver
22: wavelength-tunable filter
23: optical receiver
24: wavelength-tunable optical transmitter
26: wavelength multiplexer/demultipler
27: coherent receiver
28: local oscillation light source
51: OSU
100a, 100b, 100c: parent node
151: optical multiplexer/demultipler
152: wavelength router
200, 200a, 200b, 200c: child node
250: optical fibers
300, 300a, 301, 301a, 301b, 302, 302a, 302b: optical communication system

The invention claimed is:

1. A discovery method in a wavelength-tunable WDM/TDM-PON (WDM: Wavelength Division Multiplexing, TDM: Time Division Multiplexing, PON: Passive Optical Network) in which a parent node and child nodes are connected through optical fibers,
wherein an identifier that is unchanged even when a child node changes its downstream and upstream wavelengths is given to the unregistered child node from the parent node that has received a response signal sent from the unregistered child node in response to a search signal received from the parent node, wherein the search signal is sent from the parent node with a downstream wavelength $\lambda_{Dm}$ (m=1, 2, . . . M) at predetermined timing, and wherein the response signal is sent from the unregistered child node with an upstream wavelength $\lambda_{Un}$ (n=1, 2, . . . N),
with a round trip time (RTT) at the downstream wavelength $\lambda_{Dm}$ and the upstream wavelength $\lambda_{Un}$ between the parent node and the child node and a wavelength dependency of the refractive index of the optical fibers, wherein ranging is performed for calculating, for the unregistered child node, the RTTs in all combinations of downstream wavelengths ($\lambda_{D1}$, $\lambda_{D2}$, . . . , $\lambda_{DM}$) of downstream signals from the parent node to the child node and upstream wavelengths ($\lambda_{U1}$, $\lambda_{U2}$, . . . , $\lambda_{UM}$) of upstream signals from the child node to the parent node, and wherein the RTTs in all the combinations calculated by the ranging are stored.

2. An optical communication method in a wavelength-tunable WDM/TDM-PON in which a parent node and child nodes are connected through optical fibers,
wherein an identifier given to the child node remains unchanged when a child node changes its downstream and upstream wavelengths,
wherein RTTs in all combinations of a downstream wavelength of a downstream signal from the parent node to the child node and an upstream wavelength of an upstream signal from the child node to the parent node are stored for each of the identifiers in a table, and
wherein the use of the RTT corresponding to the combination of the downstream wavelength and the upstream wavelength allocated to the child node is detected by referring to the table, wherein a transmission permission time of the upstream signal is determined, and wherein the determined transmission permission time is provided to the child node by the parent node
wherein an identifier that is unchanged even when the child node changes its downstream and upstream wavelengths is given to the unregistered child node from the parent node that has received a response signal sent from the unregistered child node in response to a search signal received from the parent node, wherein the search signal is sent from the parent node with a downstream wavelength $\lambda_{Dm}$ (m=1, 2, . . . M) at predetermined timing, and wherein the response signal is sent from the unregistered child node with an upstream wavelength $\lambda_{Un}$ (n=1, 2, . . . N), and
with an RTT at the downstream wavelength $\lambda_{Dm}$ and the upstream wavelength $\lambda_{Un}$ between the parent node and the child node and a wavelength dependency of the refractive index of the optical fibers, wherein ranging is performed for calculating, for the unregistered child node, the RTTs in all combinations of downstream wavelengths ($\lambda_{D1}$, $\lambda_{D2}$, . . . , $\lambda_{DM}$) of downstream signals from the parent node to the child node and upstream wavelengths ($\lambda_{U1}$, $\lambda_{U2}$, . . . , $\lambda_{UM}$) of upstream signals from the child node to the parent node.

3. An optical communication system in a wavelength-tunable WDM/TDM-PON, the system comprising:
a parent node which sends downstream signals with wavelengths of $\lambda_{D1}$ to $\lambda_{DM}$, wherein M is an integer not less than 2, and receives upstream signals with wavelengths of $\lambda_{U1}$ to $\lambda_{UN}$, wherein N is an integer not less than 2;
child nodes to which an identifier unchanged even when a child node changes its downstream and upstream wavelengths is given, to which one of the wavelengths $\lambda_{D1}$ to $\lambda_{DM}$ and one of the wavelengths $\lambda_{U1}$ to $\lambda_{UN}$ are allocated from the parent node as a downstream wavelength and an upstream wavelength, respectively, and which receives a downstream signal on the allocated downstream wavelength and sends an upstream signal on the allocated upstream wavelength; and
optical fibers through which the parent node and the child nodes are connected to each other,
wherein the parent node has a table for storing, for each of the identifiers, RTTs in all combinations of the downstream wavelengths and the upstream wavelengths and a controller which determines a transmission permission time of an upstream signal with the use of the RTT corresponding to the combination of the downstream wavelength and the upstream wavelength allocated to the child node which is detected by referring to the table, and notifies the child node of the transmission permission time of the upstream signal,
wherein the controller executes a discovery method in a discovery process,
wherein the discovery method is in the wavelength-tunable WDM/TDM-PON in which the parent node and the child nodes are connected through optical fibers,
wherein an identifier that is unchanged even when a child node changes its downstream and upstream wavelengths is given to the unregistered child node from the parent node that has received a response signal sent from the unregistered child node in response to a search signal received from the parent node, wherein the search signal is sent from the parent node with a downstream wavelength $\lambda_{Dm}$ (m=1, 2, . . . M) at predetermined timing, and wherein the response signal is sent from the unregistered child node with an upstream wavelength $\lambda_{Un}$ (n=1, 2, . . . M), and
with an RTT at the downstream wavelength $\lambda_{Dm}$ and the upstream wavelength $\lambda_{Un}$ between the parent node and the child node and a wavelength dependency of the refractive index of the optical fibers, wherein ranging is performed for calculating, for the unregistered child node, the RTTs in all combinations of downstream wavelengths ($\lambda_{D1}$, $\lambda_{D2}$, . . . , $\lambda_{DM}$) of downstream signals from the parent node to the child node and upstream wavelengths ($\lambda_{U1}$, $\lambda_{U2}$, . . . , $\lambda_{UM}$) of upstream signals from the child node to the parent node, and wherein the RTTs in all the combinations calculated by the ranging are stored.

4. The optical communication system according to claim 3, wherein the parent node has optical transceivers in which a unique downstream wavelength and a unique upstream wavelength are set and an optical multiplexer/demultipler which is connected to the optical transceivers outputs the downstream signals from the optical transceivers to the optical fibers and outputs the upstream signals from the optical fibers to the optical transceivers, and wherein the controller controls one of the optical transceivers to send a search signal on a fixed downstream wavelength and executes the discovery method in the discovery process.

5. The optical communication system according to claim 3, wherein the parent node has optical transceivers in which downstream wavelengths of $\lambda_{D1}$ to $\lambda_{DM}$ can be set and a wavelength router connected to the optical transceivers through optical transceiver-side ports, which outputs the downstream signals from the optical transceiver-side ports to different optical fiber-side ports according to downstream wavelengths, and connected to the optical fibers through optical fiber-side ports, which outputs the upstream signals from the optical fiber-side ports to the different optical transceiver-side ports according to upstream wavelengths, and the controller controls some of the optical transceivers to send a search signal on one downstream wavelength and executes the discovery method in the discovery process.

6. The optical communication system according to claim 3, wherein the parent node has optical transceivers in which at least one of downlink wavelengths can be set of among the wavelengths of $\lambda_{D1}$ to $\lambda_{DM}$ and optical multiplexer/demultiplexer which is connected to the optical transceivers, outputs the downstream signals from the optical transceivers to the optical fibers, outputs the upstream signals from the optical fibers to the optical transceivers, and the controller controls at least one of the optical transceivers to send search signals on several downstream wavelengths and executes the discovery method in the discovery process.

7. The optical communication system according to claim 3, wherein the parent node has optical transceivers in which downstream wavelengths of $\lambda_{D1}$ to $\lambda_{DM}$ can be set and wavelength router which is connected to the optical transceivers through optical transceiver-side ports, outputs the downstream signals from the optical transceiver-side ports to different optical fiber-side ports according to a downstream wavelengths, is connected to the optical fibers through optical fiber-side ports, outputs the upstream signals from the optical fiber-side ports to the different optical transceiver-side ports according to upstream wavelengths, and the controller controls one of the optical transceivers to send search signals on several downstream wavelengths and executes the discovery method in the discovery process.

* * * * *